United States Patent
Beckemeyer

(10) Patent No.: US 7,701,883 B2
(45) Date of Patent: Apr. 20, 2010

(54) TELEPHONE NUMBER BINDING IN A VOICE-OVER-INTERNET SYSTEM

(75) Inventor: David S. Beckemeyer, Danville, CA (US)

(73) Assignee: TelEvolution LLC, Danville, CA (US)

( * ) Notice: Subject to any disclaimer, the term of this patent is extended or adjusted under 35 U.S.C. 154(b) by 1589 days.

(21) Appl. No.: 10/964,518

(22) Filed: Oct. 13, 2004

(65) Prior Publication Data

US 2006/0077959 A1    Apr. 13, 2006

(51) Int. Cl.
*H04L 12/16* (2006.01)
(52) U.S. Cl. ................... 370/260; 370/261; 370/262
(58) Field of Classification Search ......... 370/260–262
See application file for complete search history.

(56) References Cited

U.S. PATENT DOCUMENTS

| | | | |
|---|---|---|---|
| 5,983,093 A * | 11/1999 | Haimi-Cohen | 455/411 |
| 6,956,666 B2 * | 10/2005 | Tanaka | 358/1.15 |
| 7,093,121 B2 * | 8/2006 | Barton et al. | 713/150 |
| 7,154,912 B2 * | 12/2006 | Chong et al. | 370/486 |
| 7,164,762 B2 * | 1/2007 | Hanson et al. | 379/212.01 |
| 7,420,956 B2 * | 9/2008 | Karaoguz et al. | 370/338 |
| 2003/0059005 A1 * | 3/2003 | Meyerson et al. | 379/88.17 |
| 2005/0144451 A1 * | 6/2005 | Voice et al. | 713/170 |
| 2006/0034261 A1 * | 2/2006 | Benveniste | 370/352 |
| 2007/0291733 A1 * | 12/2007 | Doran et al. | 370/352 |

\* cited by examiner

*Primary Examiner*—Daniel J Ryman
*Assistant Examiner*—Jay P Patel

(57) ABSTRACT

Telephone number binding in a voice-over-Internet system is provided. One embodiment is a method for provisioning a customer voice-over-Internet device for voice-over-Internet service. One such method comprises: providing a customer voice-over-Internet device for communicating with an existing telephone line and a data network; providing a telephone number associated with the existing telephone line to a voice-over-Internet platform; and linking the existing telephone number to a unique identifier associated with the customer voice-over-Internet device.

23 Claims, 11 Drawing Sheets

| EXISTING CUSTOMER TELEPHONE NO. | DEVICE IDENTIFIER |
|---|---|
| xxx-xxx-xxxx | 1001001 |
| yyy-yyy-yyyy | 1001002 |
| aaa-aaa-aaaa | 1001003 |
| bbb-bbb-bbbb | 1001004 |

TELEPHONE NUMBER BINDING IN A VOICE-OVER-INTERNET SYSTEM

BACKGROUND

Currently, there are a number of solutions that enable customers to place telephone calls over the Internet, rather than over the public-switched telephone network (PSTN). So-called Internet telephony services (e.g., voice-over-Internet-Protocol (VoIP), voice-over-digital-subscriber-line (VoDSL), voice-over-asynchronous-transfer-mode (VoATM), etc.) have become much more prevalent as the number of broadband connections at residential locations has increased.

One of the earliest Internet telephony solutions is a "soft phone." A soft phone is computer software that may be installed on a typical personal computer. The computer software enables any computer device with a speaker and a microphone to place free Internet calls through an Internet service provider (ISP). Soft phones, however, suffer from various disadvantages and problems. For example, in many cases, soft phones only enable a user to make free Internet calls to other users that have installed the same or similar software on their computer. Furthermore, these software-based solutions offer no or limited calling to the PSTN.

Another Internet telephony solution employs service providers (e.g., Internet telephone service providers (ITSP)) that offer voice-over-Internet services to subscribers. An ITSP usually provides the subscribers with supporting hardware. The supporting hardware may comprise a stand-alone device manufactured by another company (e.g., a VoIP phone) that connects to the Internet. The supporting hardware, software, etc. may also be other equipment that functions as an interface between the customer's standard telephone and the PSTN and Internet connections. Typically, the ITSP sells or leases the hardware to the subscriber and charges the customer a subscription service (e.g., monthly service fee) for the services. In some cases, the potential subscriber may purchase the hardware from another entity and then request service from the ITSP.

ITSP solutions also have a number of disadvantages. Many customers have been slow to adopt this approach because they are unwilling to abandon the familiar expectations of their traditional phone service. Another major disadvantage is that the hardware provided by most ITSPs is difficult for some consumers to use, configure, etc.

In order to configure the hardware provided by the ITSP for communication with other devices, hardware, etc., a provisioning process is typically performed. In general, the provisioning process involves two steps: (1) establishing a terminating ID for the subscriber; and (2) provisioning the hardware with the information necessary to use the terminating ID to facilitate Internet telephony services. The purpose of the provisioning process is to enable the ITSP to associate the terminating ID with the hardware for a particular subscriber. For example, some ITSPs assign the terminating ID during an ordering/activation process with the subscriber. The terminating ID is typically a private number assigned by the service provider at sign-up and is usually specific to the ITSP. In other words, the ITSP defines the terminating ID and then associates the number with the subscriber's account.

After the terminating ID is established by the ITSP, the ITSP may provide the subscriber with basic information (e.g., username, password, IP addresses of gateway servers, etc.), and the subscriber is left with the task of configuring the hardware, software, etc. In some instances, the hardware may be pre-provisioned by the ITSP. For example, at the time of account creation, the hardware may be provisioned, bound to the account, and shipped to the subscriber. After the hardware is installed by subscriber, the hardware may register with an ITSP server, which recognizes the device by its association to the subscriber's account.

Despite the growth of Internet telephony services and products, however, there is still a need for improved voice-over-Internet solutions.

SUMMARY

Various embodiments of systems, methods, computer programs, platforms, etc. for telephone number binding in a voice-over-Internet system are provided. One embodiment is a method for provisioning a customer voice-over-Internet device for voice-over-Internet service. One such method comprises: providing a customer voice-over-Internet device for communicating with an existing telephone line and a data network; providing a telephone number associated with the existing telephone line to a voice-over-Internet platform; and linking the existing telephone number to a unique identifier associated with the customer voice-over-Internet device.

Another such method comprises: simultaneously controlling a data session and a telephone call between a voice-over-Internet platform and a customer device; and linking a telephone number received via the telephone call to the customer device, if a transmitted session identifier received via the telephone call matches a session identifier associated with the data session.

Yet another such method comprises: establishing a data session between a customer device and a voice-over-Internet platform via a data network; receiving a device identifier associated with the customer device via the data session; instructing the customer device, via the data session, to make a telephone call to a predetermined telephone number that terminates at the voice-over-Internet platform; capturing a telephone number corresponding to the customer device via the telephone call; instructing the customer device, via the data session, to transmit a session identifier associated with the data session to the voice-over-Internet platform via the telephone call; and associating the telephone number with the customer device if the transmitted session identifier matches the session identifier.

Another embodiment comprises a voice-over-Internet system. One such system comprises: a customer device comprising a data interface for communicating via a data network and a telephone interface for communicating with the public-switched telephone network (PSTN); a voice-over-Internet platform for communicating with the customer device via the PSTN and a data session that occurs over the data network; and a telephone number binding system associated with the voice-over-Internet platform, the telephone number binding system configured to provision the customer device by linking the customer's existing telephone number to a unique device identifier corresponding to the customer device.

Another embodiment comprises a voice-over-Internet platform. One such platform comprises: means for simultaneously controlling a data session and a telephone call with a customer device; and means for linking an existing telephone number with the customer device, the existing telephone number received via one of the data session and the telephone call.

BRIEF DESCRIPTION OF THE DRAWINGS

Other aspects, advantages and novel features of the invention will become more apparent from the following detailed description when considered in conjunction with the following drawings.

DETAILED DESCRIPTION

Figure 1:
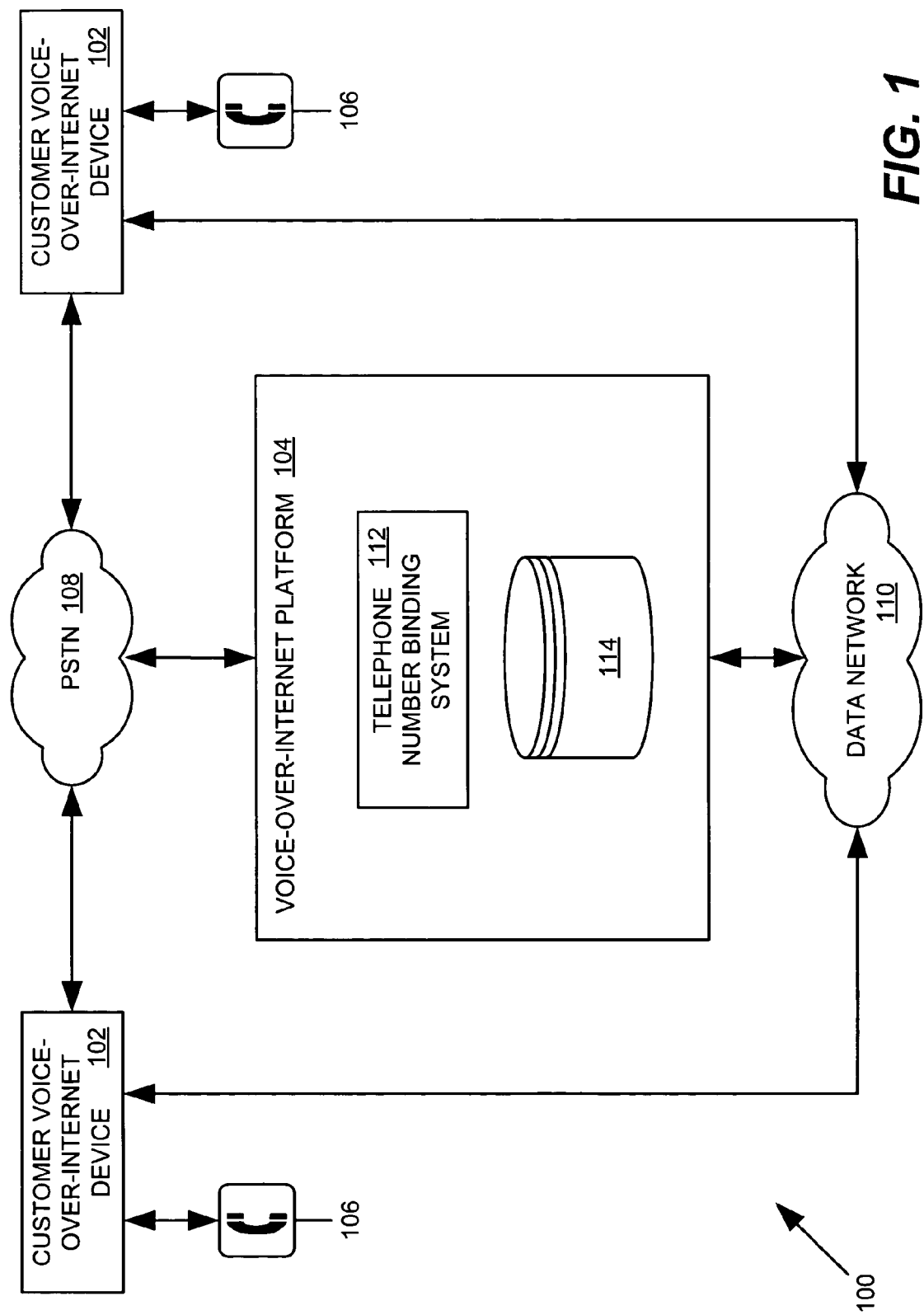
FIG. 1 is a block diagram of an embodiment of a voice-over-Internet system.

Various embodiments of systems, methods, computer programs, communications platforms, etc. that employ telephone number binding in a voice-over-Internet environment will be described with respect to FIGS. 1-11. As an introductory matter, however, an exemplary embodiment of a system for providing voice-over-Internet services will be briefly described. With regard to all described embodiments, it should be appreciated that the term "voice-over-Internet" is not limited to any particular protocol, transmission medium, communications network, topology, architecture, etc. Rather, "voice-over-Internet" applies to any system that supports telephone calls between two or more individuals via a data network. By way of example, voice-over-Internet (VOI) should be construed to include existing and future Internet telephony services, such as voice-over-Internet-Protocol (VoIP), voice-over-digital-subsriber-line (VoDSL), voice-over-asynchronous-transfer-mode (VoATM), etc. Furthermore, it should be appreciated that the voice services need not be provided over a public network but, rather, may also be provided over a private network, such as a local area network, wide area network, etc., to name a few examples.

The exemplary system for providing VOI services comprises a VOI platform which supports communications with one or more customer VOI devices located at the customer premise. The customer VOI device communicates with the customer's existing telephone line to the public-switched telephone network (PSTN) and the customer's data line to a data service provider. The customer VOI device may also connect to the existing telephone or, in alternative embodiments, the customer VOI device may be integrated with appropriate functionality, hardware, etc. for controlling PSTN communications. From the customer's perspective, the customer VOI device is a black-box device that may be easily configured (and, in some embodiments, automatically configured) for communication with the VOI platform. After the device is provisioned, the customer may initiate telephone calls to other individuals without regard to whether the call is being placed over the PSTN or the data network. The customer VOI device and the VOI platform perform the logical functions necessary to support both standard PSTN telephone calls and VOI calls.

A provisioning process may be initiated which configures the customer VOI device for VOI service. The provisioning process may be initiated by the customer, the customer VOI device, or the VOI platform. During the provisioning process, the customer's existing telephone number is provided to the VOI platform. As described below, the existing telephone number is used by the VOI platform as a terminating identifier during the provisioning of VOI and/or PSTN services. In this manner, the existing telephone number may be used to make VOI calls to the corresponding customer VOI device. Therefore, rather than having to assign a new terminating identifier, the VOI platform may use the existing telephone number as the terminating identifier.

It should be appreciated that the existing telephone number may be provided to the VOI platform in a number of ways. For example, in one embodiment, the existing telephone number may be automatically provided to the VOI platform by the customer VOI device, either via the data network or the PSTN. In alternative embodiments, the customer may provide the existing telephone number to the VOI platform. The VOI platform may support an interactive voice response (IVR) system by which the customer interactively supplies the existing telephone number. The VOI platform may also support a web-based (or other data) channel via the data network, which enables the customer, the customer VOI device, or a combination thereof to provide the existing telephone number to the VOI platform.

Although not necessary, in certain embodiments, the VOI platform may also provide a means for authenticating the telephone number provided, in order to confirm that the telephone number is in fact within the control of the customer VOI device. Without any authentication process, it may be possible for a customer to usurp someone else's phone number. Therefore, in certain embodiments, it may be desirable to employ a reliable and accurate authentication scheme to validate the telephone number provided. The authentication mechanism may be fully automated via data and/or PSTN connections between the customer VOI device and the VOI platform. In some embodiments, at least portions of the authentication scheme may involve interactive or manual input from the customer, rather than the customer VOI device.

As described in more detail below, one embodiment of a provisioning method or process may be fully automated in order to minimize (or completely avoid) any burdensome user interaction with the customer VOI device or the VOI platform. The communications between the VOI platform and the customer VOI device occur via parallel PSTN and data connections. The customer connects the customer VOI device to a telephone line and a data network. The customer VOI device establishes communication with the VOI platform via the data network. The customer VOI device transmits a unique device identifier stored in memory to the VOI platform via the data network. The VOI platform may verify the customer VOI device based on the unique device identifier. If the device is verified, the VOI platform may generate a unique session identifier for the data connection. The VOI platform instructs the customer VOI device (via the data network) to make a telephone call to a predetermined telephone number, which terminates at the VOI platform. The customer VOI device initiates the telephone call over the PSTN to the predetermined telephone number. When the VOI platform receives the call from the customer VOI device, the customer's telephone number may be identified through the automatic number identification (ANI) service provided by the supporting telephone service provider. Via the data network, the VOI platform may then instruct the customer VOI device to transmit the session identifier over the telephone call (e.g., using dual tone multi-frequency (DTMF) digits). The VOI platform compares the transmitted information to the session identifier for the data connection to confirm the identity of the customer VOI device. If the correct session identifier is received by the VOI platform, the VOI platform may authenticate the customer VOI device and link the customer VOI device to the corresponding telephone number.

It should be appreciated that additional and/or alternative schemes may be employed to confirm that the telephone number is within the control of the customer VOI device as deemed appropriate by particular system providers, for particular applications or customers, etc. Furthermore, it should be appreciated that the authentication request(s) may be submitted to the customer VOI device via the data channel or the PSTN connection. In the embodiment described above, the call-to-platform request and the transmit-session-identifier request initiated by the VOI platform are performed via the data session and the corresponding actions or responses from the customer VOI device are provided via the PSTN. One of ordinary skill in the art will appreciate that the closed-loop authentication scheme may be reversed so that the requests from the VOI platform are made via the PSTN and the customer VOI device responds via the data session.

Regardless of the authentication scheme (or whether an authentication scheme is even performed), the VOI platform associates (e.g., links, binds, relates, etc.) the existing telephone number to the customer VOI device. In this manner, the VOI platform may develop and maintain a database containing information that links a particular customer VOI device to the existing telephone number. The association between the existing telephone number and the customer VOI device enables the VOI platform to establish VOI calls between customers. For example, when a calling customer associated with a first customer VOI device attempts to place a call to a particular PSTN telephone number, the VOI platform may determine whether the customer at that particular PSTN telephone number has been provisioned by the VOI platform. The VOI platform may access the database and determine whether the PSTN telephone number has been associated with a second customer VOI device. If the PSTN telephone number does not have a corresponding customer VOI device, the first customer VOI device may use the PSTN to place the call to the called customer. However, in the event that the called customer has previously provisioned a second customer VOI device (and, therefore, the VOI platform has a database record or other data structure associating the PSTN telephone number to the customer VOI device), the VOI platform may orchestrate a VOI call between the calling customer and the called customer via the respective customer VOI devices.

Having described the general operation of an exemplary system for providing VOI services, various additional embodiments will be described with respect to FIGS. 1-11.

FIG. 1 illustrates an embodiment of a system 100 for providing VOI services to one or more customer VOI devices 102. As illustrated in FIG. 1, customer VOI device(s) 102 may connect to a telephone 106, although in alternative embodiments customer VOI device(s) 102 may integrate telephone 106 into the device. Although not shown in FIG. 1, it should be appreciated that customer VOI device(s) 102 may include appropriate connection(s) and supporting hardware/software for interfacing with a personal computer and/or a data phone (e.g., VoIP phone). As briefly described above, customer VOI device(s) 102 interface with the PSTN 108 and a data network 110. It should be further appreciated that customer VOI device(s) 102 may comprise a computer with appropriate software, hardware, etc. to function in the manner described below.

As further illustrated in FIG. 1, VOI platform 104 includes a telephone number binding system (TNBS) 112 and a database 114. In general, TNBS 112 comprises the logic, functionality, etc. for provisioning customer VOI device(s) 102 and for associating authenticated customer VOI devices 102 with the corresponding telephone number. Information corresponding to customer VOI device/telephone number bindings or pairs may be stored in database 114 and accessed as needed to support VOI services to customers.

Figure 2:
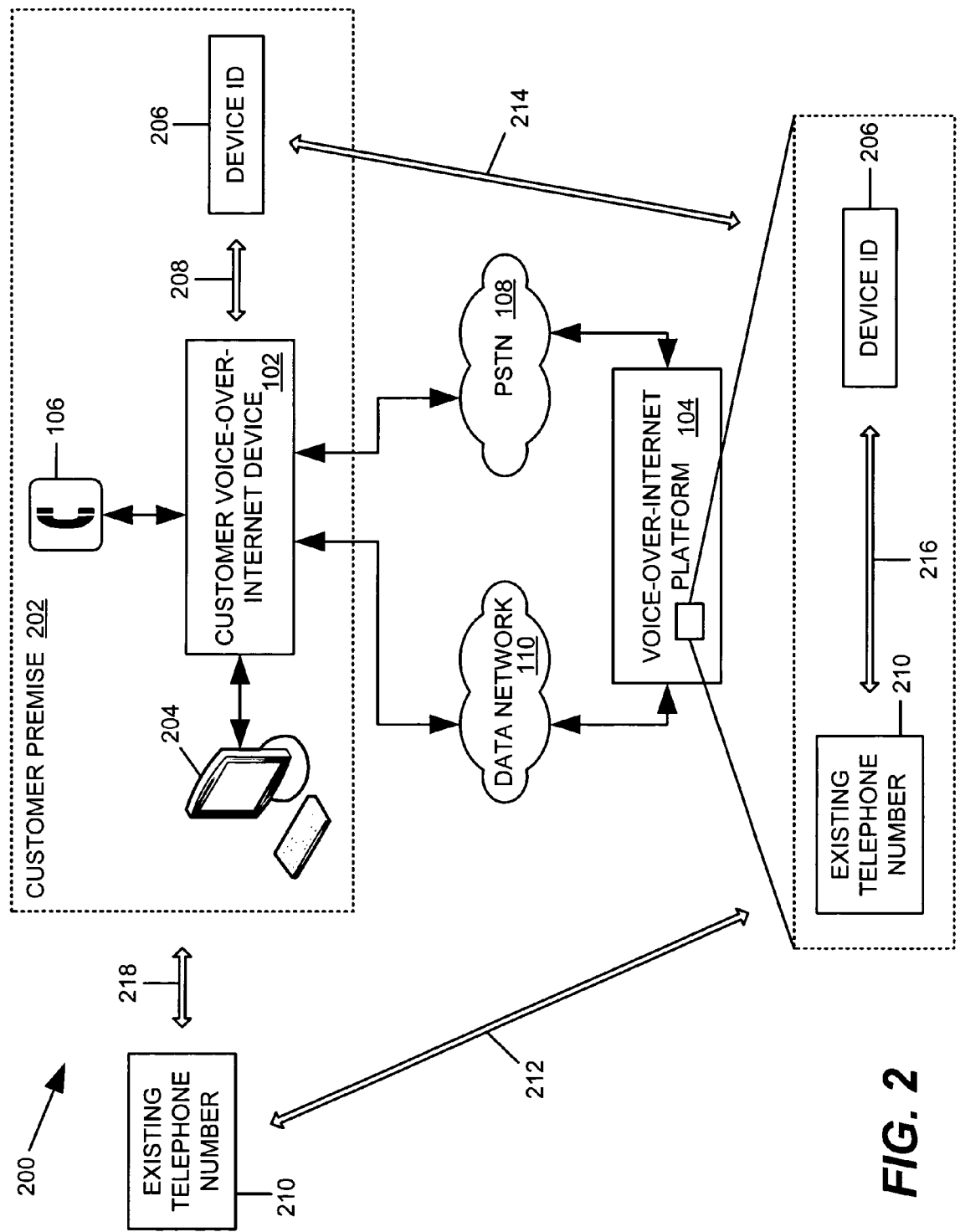
FIG. 2 is a block diagram of another embodiment of a voice-over-Internet system, which illustrates an implementation of the telephone number binding system of FIG. 2.

As mentioned above briefly, the VOI platform may provision the customer device in various ways. FIG. 2 is a block diagram of a VOI environment 200 in which a VOI platform 104 may provision a customer VOI device 102 located at a customer premise 202. As illustrated in FIG. 2, customer VOI device 102 connects to an existing telephone line to PSTN 108 and a data connection to data network 110. In this manner, VOI platform 104 may communicate with customer VOI device 102 via data network 110 and PSTN 108. As further illustrated in FIG. 2, customer premise 202 may have existing telephone service via PSTN 108 and, therefore, customer premise 202 may be associated with an existing telephone number 210 (represented by arrow 218—FIG. 2). Customer VOI device 102 may be associated with a unique device identifier (e.g., device ID 206), which is represented by arrow 208.

In general, VOI platform 104 provisions customer VOI device 102 by receiving existing telephone number 210 (arrow 212). VOI platform 104 may also receive a unique device identifier (e.g., device ID 206) associated with customer VOI device 102 (arrow 214). VOI platform 104 may receive existing telephone number 210 in various ways via data network 110 and/or PSTN 108. Furthermore, as described above, existing telephone number 210 may be automatically provided to VOI platform 104 by customer VOI device 102, either via the data network or the PSTN. In alternative embodiments, the customer may provide existing telephone number 210 to VOI platform 104. VOI platform 104 may also support an IVR system by which the customer interactively supplies existing telephone number 210. As further illustrated in FIG. 2, customer premise 202 may include a computer 204 which also communicates with VOI platform 104. Computer 204 may connect directly to data network 110 or to customer VOI device 102. Thus, existing telephone number 210 may be provided to VOI platform 104 via a web-based (or other data) channel between computer 204 and VOI platform 104.

Regardless of the manner in which existing telephone number 210 is provided, VOI platform 104 continues the provisioning process by associating existing telephone number 210 to the unique device identifier (e.g., device ID 206) associated with customer VOI device 102. As illustrated by arrow 216, VOI platform 104 may store existing telephone number 210 and device ID 206 in database 114 as a look-up data pair or binding. Thus, VOI platform 104 may use existing telephone number 210 as the terminating identifier for providing VOI services to customer VOI device 102.

Figure 3:
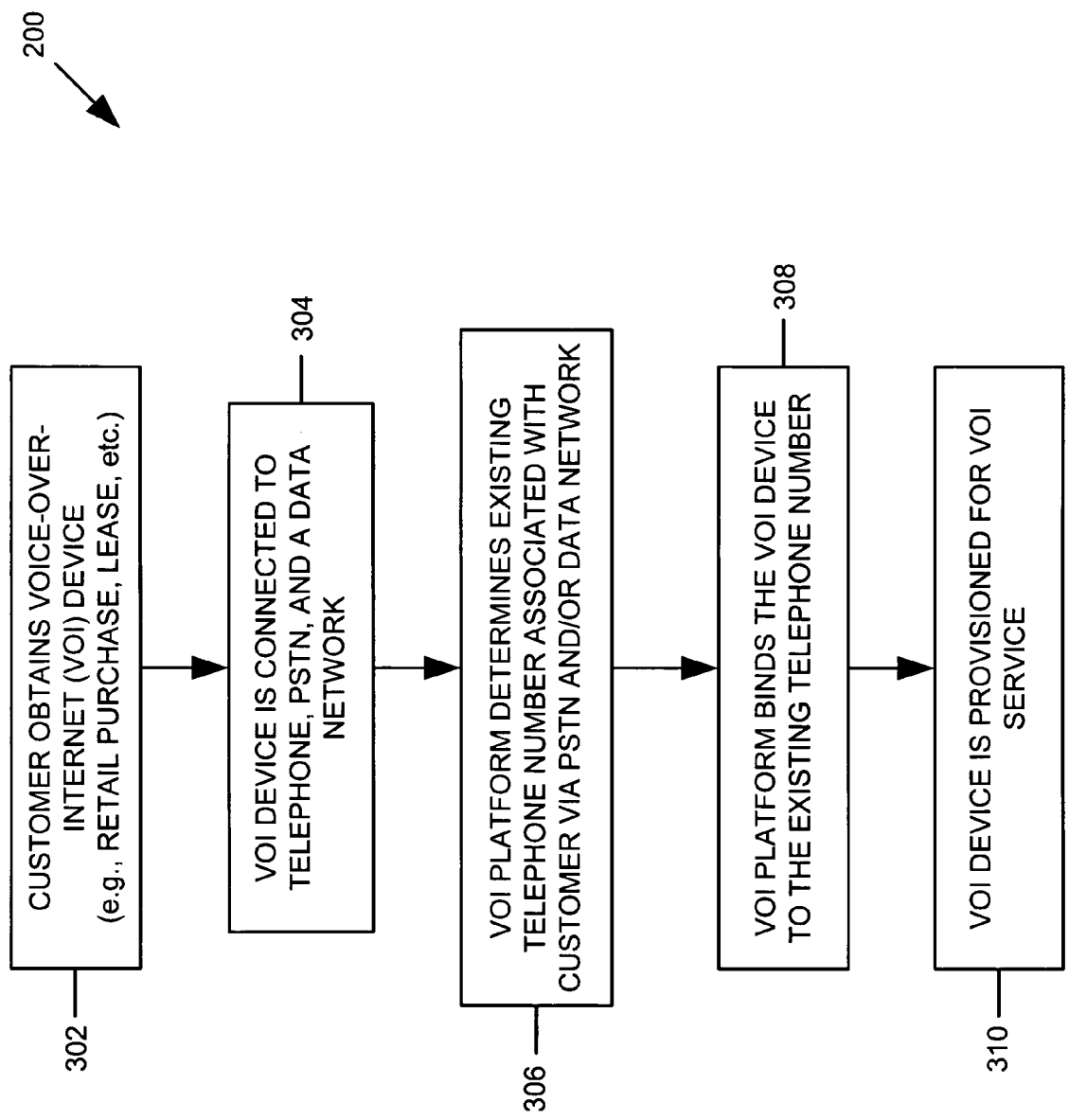
FIG. 3 is a flow chart illustrating the general architecture, operation, and/or functionality of an embodiment of a method for provisioning a customer voice-over-Internet device via the systems of FIGS. 1 & 2.

FIG. 3 illustrates another embodiment of a provisioning method. At block 302, a customer obtains a customer VOI device 102. The customer may purchase or lease the device. Customer VOI device 102 may also be provided to the customer by a service provider. At block 304, customer VOI device 102 is connected to a telephone 106, PSTN 108, and data network 110. As mentioned above, customer VOI device 102 may integrate the functionality of telephone 106 into the device, in which case customer VOI device 102 is connected to PSTN 108 and data network 110. At block 306, VOI platform 104 determines an existing telephone number 210 associated with the customer. VOI platform 104 may receive existing telephone number 210 in a variety of ways via PSTN 108 and/or data network 110. At block 308. VOI platform 104 binds customer VOI device 102 to existing telephone number 210. At block 310, VOI platform 103 may provision customer VOI device 102 for VOI service.

Figure 4A:
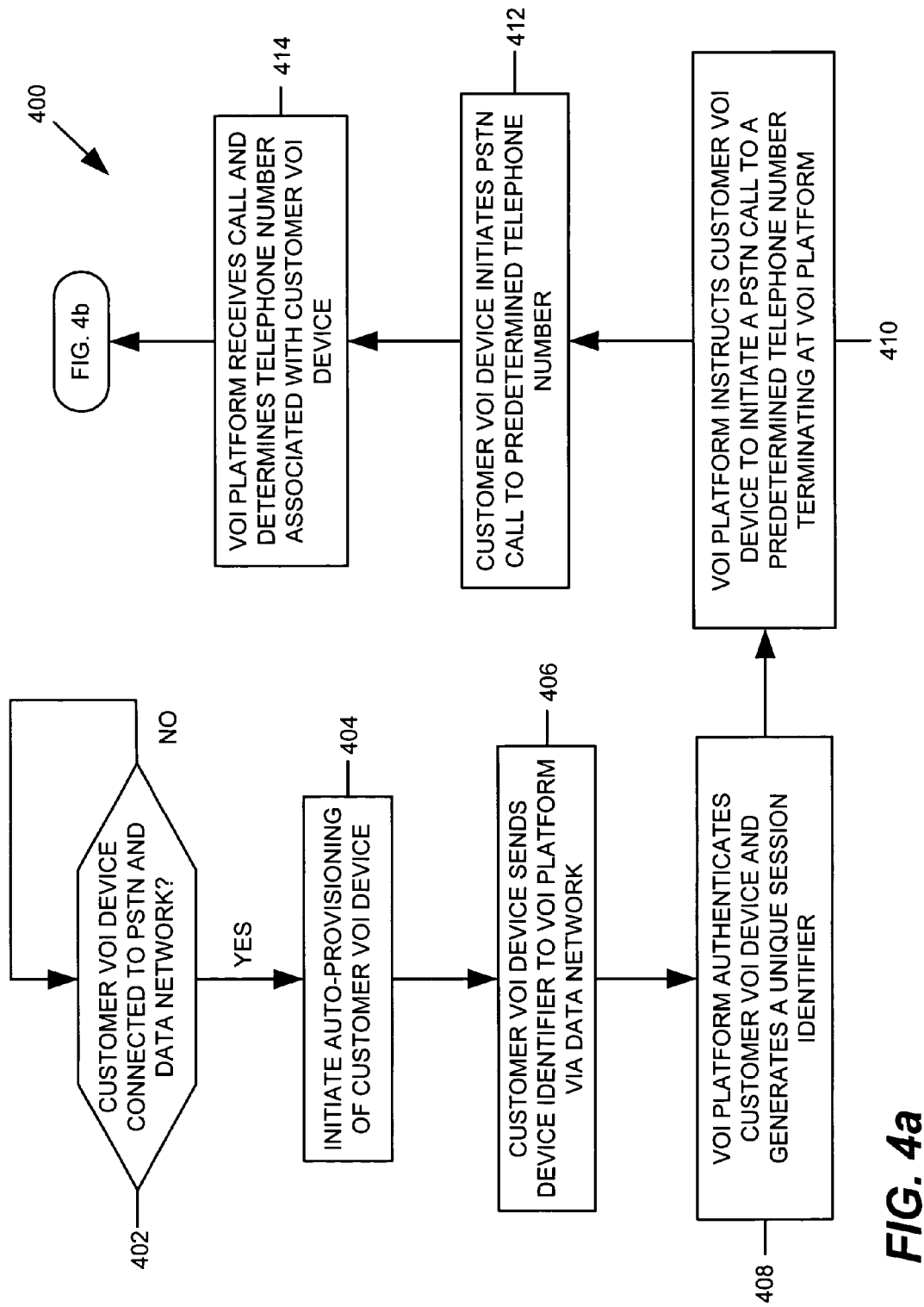
FIGS. 4*a* & 4*b* represent a flow chart that illustrates the general operation of the voice-over-Internet systems of FIGS. 1 & 2.
Figure 4B:
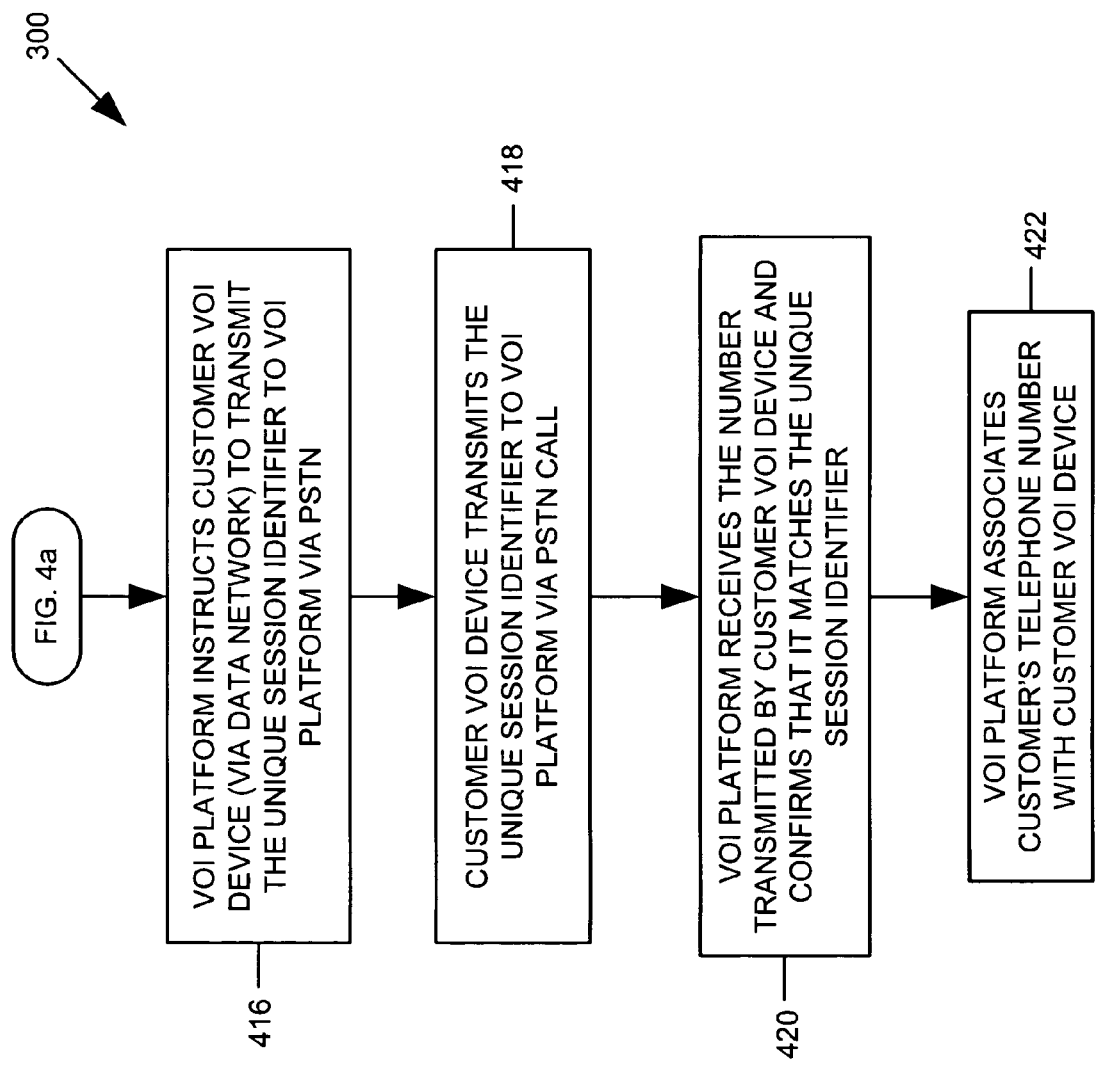

FIGS. 4a & 4b illustrate another embodiment of a method for provisioning a customer VOI device 102, in which customer VOI device 102 is initially provisioned with little or no user interaction. For instance, the customer may connect the customer VOI device 102 to an existing telephone line and a data line—but logic embedded within customer VOI device 102 and VOI platform 104 controls the provisioning process. Thus, it should be appreciated that customer VOI device 102 and VOI platform 104 may automatically provision the device without burdening the customer.

As illustrated by decision block 402, auto-provisioning is not initiated until customer VOI device 102 is connected to PSTN 108 and a data network 110 (FIGS. 1 and 2). If VOI device 102 is appropriately connected, at block 404, the auto-provisioning process is initiated. At block 406, customer VOI device 102 may submit a device identifier (e.g., device ID 206—FIG. 2) associated with the device to VOI platform 104 via data network 110. For example, each customer VOI device 102 may have unique credentials written to the device during the manufacturing process, which uniquely identify the customer VOI device 102 to VOI platform 104. The unique credentials (e.g., digital certificate, etc.) may be stored in any suitable manner (e.g., in flash memory).

At block 408, VOI platform 104 receives the device identifier and authenticates customer VOI device 102 based on the device identifier. In other words, VOI platform 104 verifies that customer VOI device 102 is an approved device based on the submitted device identifier. Therefore, VOI platform 104 may prevent non-approved devices from attempting to access the platform, as well as provide protection from attacks, forged requests, etc. It should be appreciated that the authentication process may support various encryption schemes, algorithms, etc. to provide suitable security measures and to further guarantee the authenticity of customer VOI device 102. If the customer VOI device 102 is authenticated, at block 408, VOI platform 104 may assign a number to the provisioning request. For instance, VOI platform 104 may generate a unique session number or identifier (e.g., random number, pseudo-random number, etc.) that identifies the provisioning request initiated by customer VOI device 102.

At block 410, VOI platform 104 instructs the authenticated customer VOI device 102 to initiate a telephone call over PSTN 108 to a predetermined telephone number that terminates at VOI platform 104. As described below in more detail, the instructions, messages, requests, commands, data communications, etc. between customer VOI device 102 and VOI platform 104 may use any suitable protocol. It should be appreciated that the device identifier may be provided by VOI platform 104 or, in alternative embodiments, may be locally stored in customer VOI device 102. At block 412, customer VOI device 102 initiates the telephone call via PSTN 108 to the predetermined telephone number. At block 414, VOI platform 104 receives the telephone call initiated by customer VOI device 102 and determines the existing telephone number 210 (FIG. 2) associated with customer VOI device 102 (e.g., via an automatic number identification (ANI) service provided by the supporting telephone company).

Referring to FIG. 4b, at block 416, VOI platform 104 instructs customer VOI device 102 (via data network 110) to transmit the session identifier (block 408) to VOI platform 104 over the telephone call. At block 418, customer VOI device 102 transmits the session identifier over the telephone call. It should be appreciated that the session identifier may be transmitted over the telephone call in a number of ways. In one embodiment, customer VOI device 102 is configured to transmit the session identifier using dual tone multi-frequency (DTMF) tone digits.

At block 420, VOI platform 104 receives the transmitted session number and determines whether it matches the system-generated session identifier (block 408). If VOI platform 104 confirms that the session number transmitted by customer VOI device 102 via the telephone call matches the session number generated by VOI platform 104, at block 422, VOI platform 104 associates the customer's existing telephone number 210 (block 414) with customer VOI device 102. It should be appreciated that the association between the telephone number and the device may be implemented in various ways. For example, in one embodiment, the customer's telephone number may be associated, bound, linked, etc. with the device identifier. It should be appreciated that other implementations may be employed.

Figure 5:
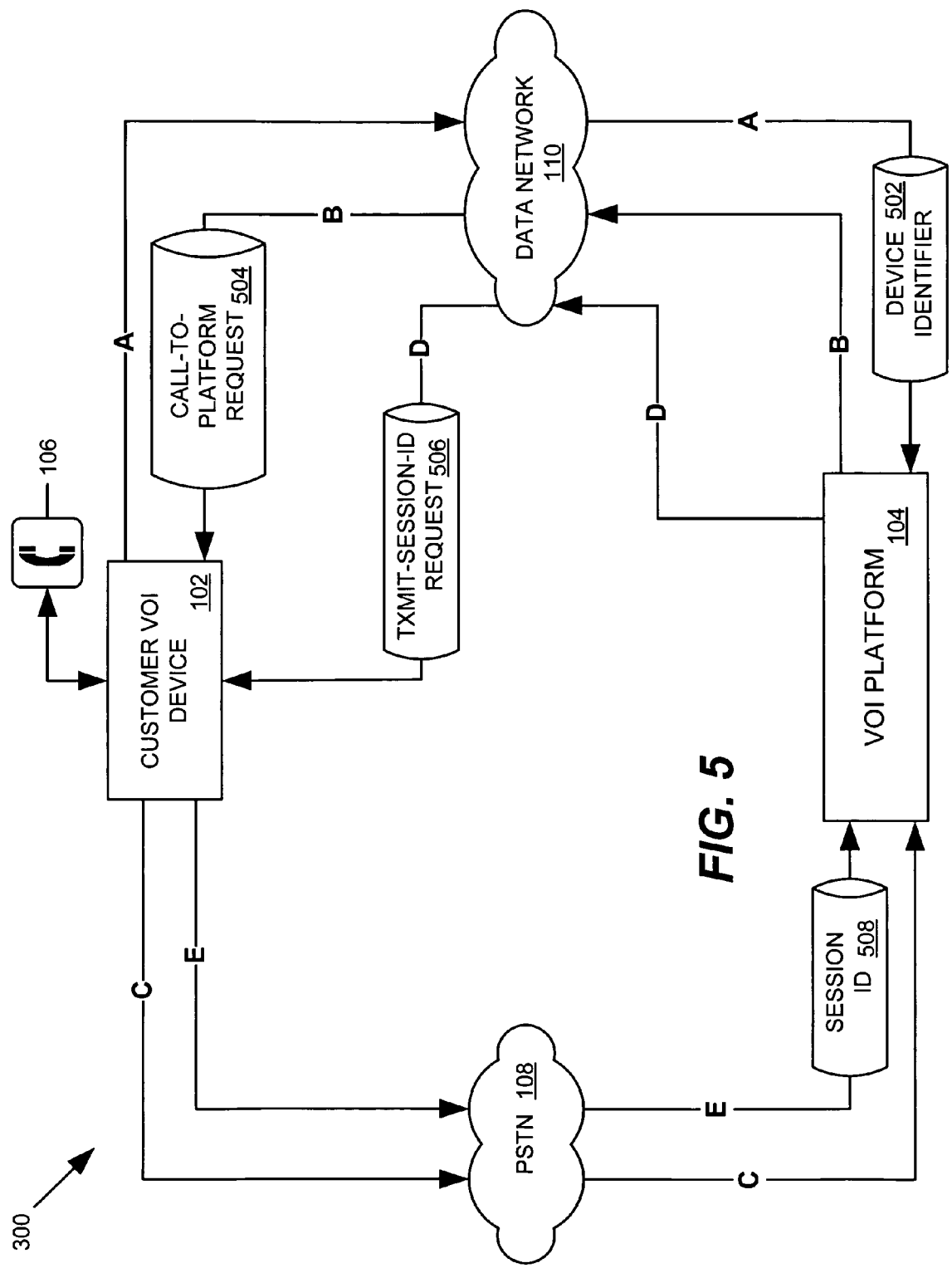
FIG. 5 is a combined block diagram and flow diagram that illustrates an embodiment of a method for provisioning the customer VOI device in the voice-over-Internet systems of FIGS. 1 & 2.

FIG. 5 illustrates the communication between customer VOI device 102 and VOI platform 104 during another embodiment of a method for provisioning customer VOI device 102. As illustrated in FIG. 5, VOI platform 104 simultaneously controls communications with customer VOI device 102 via PSTN 108 and data network 110. The provisioning method involves both a data session (data network 110) and a telephone call (PSTN 108). As described more below, VOI platform 104 uses both connections to associate the customer's existing telephone number (received via the telephone call) to a device identifier associated with customer VOI device 102 (received via the data session)—if a transmitted session identifier received via the telephone call matches a session identifier associated with the data session. In this manner, customer VOI device(s) 102 are automatically configured for the provision of VOI services with little or no demands on customer interaction. The data session between customer VOI device 102 and VOI platform 104 is represented in FIG. 5 with references lines A, B and D, while the telephone call is represented by reference lines C and E.

As illustrated by reference line A, customer VOI device 102 transmits a device identifier 502 to VOI platform 104 via data network 110. VOI platform 104 may authenticate customer VOI device 102 based on device identifier 502. Furthermore, VOI platform may generate a session number 508 to identify the data session with customer VOI device 102. VOI platform 104 provides a call-to-platform request 504 (reference line B) to customer VOI device 102. Call-to-platform request 504 instructs customer VOI device 102 to initiate the telephone call to VOI platform 104. Customer VOI device 102 initiates the telephone call to VOI platform 104 via PSTN 108 (reference line C). VOI platform 104 determines the existing telephone number 210 corresponding to customer VOI device 102 by, for example, the ANI service mentioned above. VOI platform 104 provides a transmit-session-ID request 506 to customer VOI device 102 via data network 102. Request 506 instructs customer VOI device 102 to transmit session identifier 508 via the telephone call. If the transmitted session identifier matches session identifier 508, VOI platform 104 associates the customer's existing telephone number with customer VOI device 102, and provisions the device for VOI services.

Figure 6:
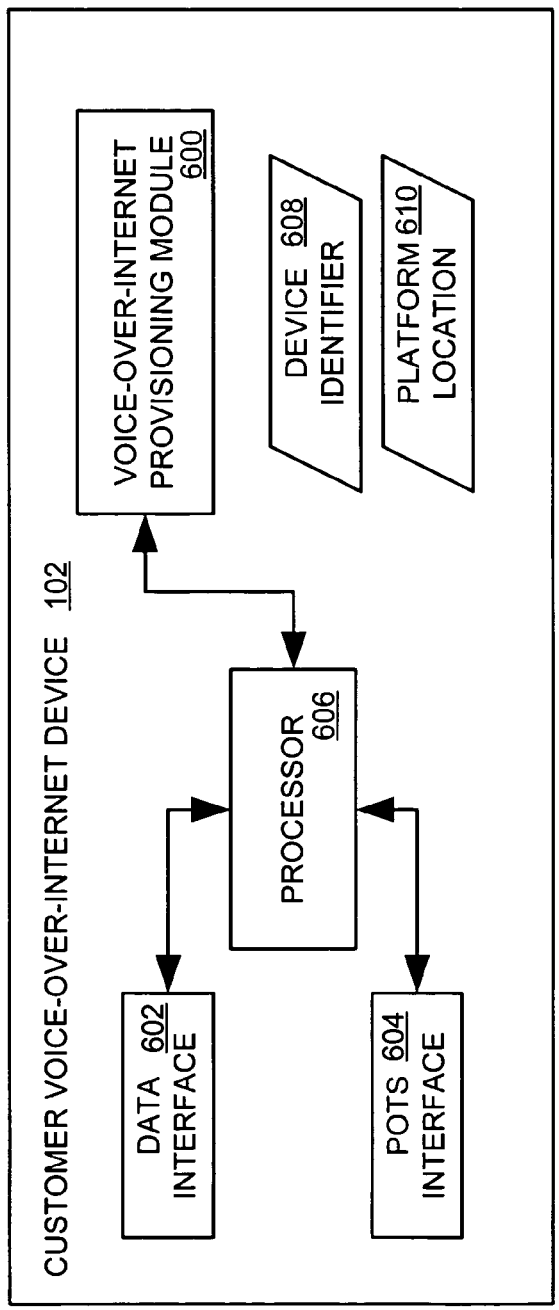
FIG. 6 is a block diagram illustrating an embodiment of the customer VOI devices of FIGS. 1 & 2.

FIG. 6 illustrates a block diagram of a customer VOI device 102 which supports dynamic provisioning with VOI platform 104. As illustrated in FIG. 6, customer VOI device 102 comprises a data interface 602, a telephone interface (e.g., plain-old-telephone-service (POTS) interface 604), a processor 606, and VOI provisioning module(s) 600. Data interface 602 comprises a suitable interface for communicating with VOI platform 104 via data network 110. It should be appreciated that a number of data interfaces (hardware, software, firmware) may be employed depending on the particular configuration of data network 110. Data interface 602 may be configured to communicate directly with data network 110 or, in alternative embodiments, may merely communicate with another data interface (e.g., cable modem, DSL modem, etc.) that connects to data network 110. The telephone interface comprises any suitable interface for enabling telephone 106 to communicate via PSTN 108. Processor 606 controls the functional operation of various aspects of customer VOI device 102, including VOI provisioning module 600. The architecture, operation, and/or functionality of an embodiment of VOI provisioning module 600 is described below with reference to FIG. 9. In general, however, it should be appreciated that VOI provisioning module 600 comprises the logic, functionality, etc. for automatically provisioning customer VOI device 102 via VOI platform 102.

Figure 7:
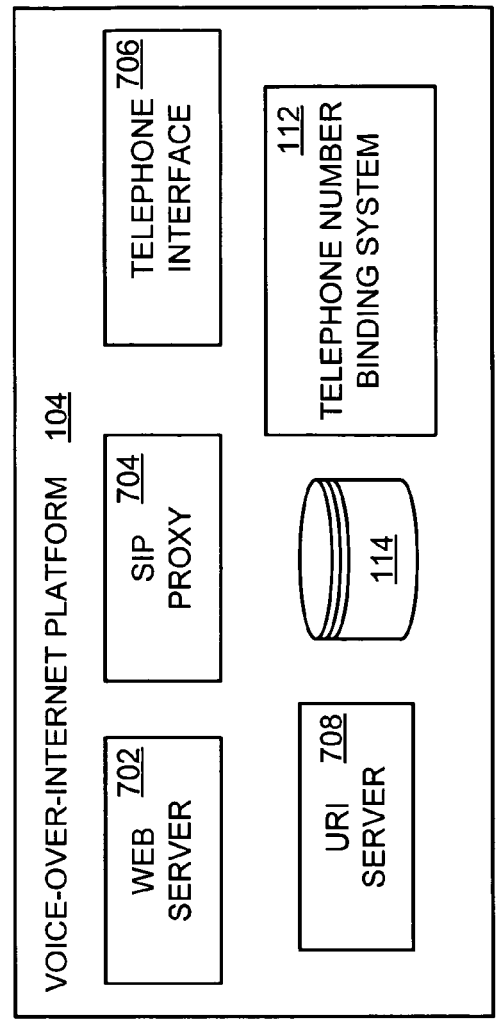
FIG. 7 is a block diagram illustrating an embodiment of the voice-over-Internet platforms of FIGS. 1 & 2.

FIG. 7 illustrates a block diagram of an embodiment of a VOI platform 104 for providing various VOI services to customer VOI device(s) 102. As illustrated in the embodiment of FIG. 7, VOI platform 104 comprises web server 702, telephone interface 706, a uniform resource identifier (URI) server 708, SIP proxy 704, database 114, and TNBS 112. It should be appreciated that the components of VOI platform 104 may be distributed across one or more computer systems at any number of physical locations. Furthermore, it should be appreciated that some of the functional aspects of VOI platform 104 may be located locally at customer VOI device(s) 102.

Figure 8:
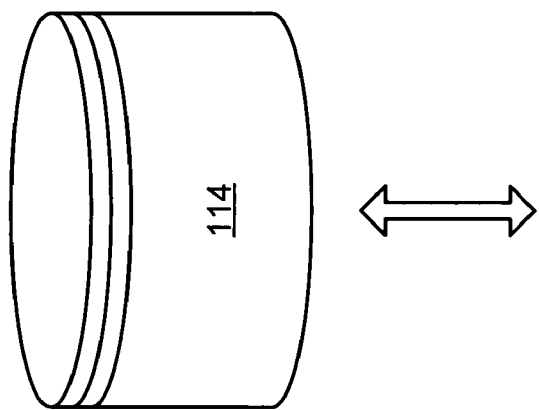
FIG. 8 is a diagram illustrating an embodiment of the telephone number binding database in the voice-over-Internet platform of FIGS. 1.

The architecture, operation, and/or functionality of an embodiment of TNBS 112 is described below with reference to FIG. 10. In general, however, it should be appreciated that TNBS 112 comprises the logic, functionality, etc. for provisioning customer VOI device 102. TNBS 112 controls the process of associating, matching, linking, etc. the customer's existing telephone number (e.g., received via the telephone call) to the device identifier 502 (FIG. 2) associated with customer VOI device 102 (e.g., received via the data session)—if a transmitted session identifier received via the telephone call matches a session identifier 508 (FIG. 2) associated with the data session. In other words, TNBS 112 integrates the functions of web server 702, SIP proxy 704, telephone interface 706, URI server 708, and database 114 to create the telephone number/device identifier pairings used to facilitate VOI communications between customers. In this regard, FIG. 8 illustrates an embodiment of database 114. As illustrated in FIG. 8, the telephone number/device identifier pairing(s) created during the provisioning process may be stored in database 114. URI server 708 may access database 114 in order to provide the VOI services.

Web server 702 controls communications with customer VOI device(s) 102 via data network 110. Web server 702 may support any suitable communication protocol. For instance, web server 702 may be configured as a secure server which employs the hypertext transfer transport protocol (HTTP) (secure)—HTTPS. Furthermore, some communications may be performed via HTTPS, while other communications may be performed over less secure channels, such as HTTP. In another embodiment, VOI platform 104 employs a session initiation protocol (SIP), which is described in detail in the following Requests for Comment (RFC) of the Internet Engineering Task Force (IETF), each of which are hereby incorporated by reference in their entirety: RFC 2543—SIP: Session Initiation Protocol; RFC 3261—SIP: Session Initiation Protocol; RFC 3262—Reliability of Provisional Responses in SIP; RFC 3263—Location SIP Servers; RFC 3264—An Offer/Answer Model with SDP; and RFC 3265—SIP-Specific Event Notification. In this embodiment, VOI platform 104 comprises a SIP proxy 704 for supporting the session initiation protocol.

Whereas data communications occur via web server 702 (and perhaps SIP proxy 704), communications with customer VOI device 102 via the PSTN 108 are handled via telephone interface 706. Telephone interface 706 comprises any suitable interface for facilitating communication via PSTN 108. As mentioned above, telephone interface 706 may be further integrated with an IVR functionality.

Uniform resource identifier (URI) server 708 provides query capabilities for compatible VOI end points (e.g., customer VOI device 102). A compatible VOI device may query URI server 708 to obtain the identifier of a VOI device stored in database 112. It should be appreciated that, in an alternative embodiment, URI server 708 and/or database 112 may further employ the ENUM system, which is defined in RFC 2916, RFC 2782, and RFC 3403, each of which are hereby incorporated by reference in their entirety.

As known in the art, SIP proxy 704 refers to any of a variety of individual SIP-related functions, roles, etc. (or a collection thereof), which may be distributed over a communications network. By way of example, depending on the particular function, SIP proxy 704 may include any of the following, or other, client and/or server roles: proxy, registrar, back-to-back user agent, etc.

Figure 9:
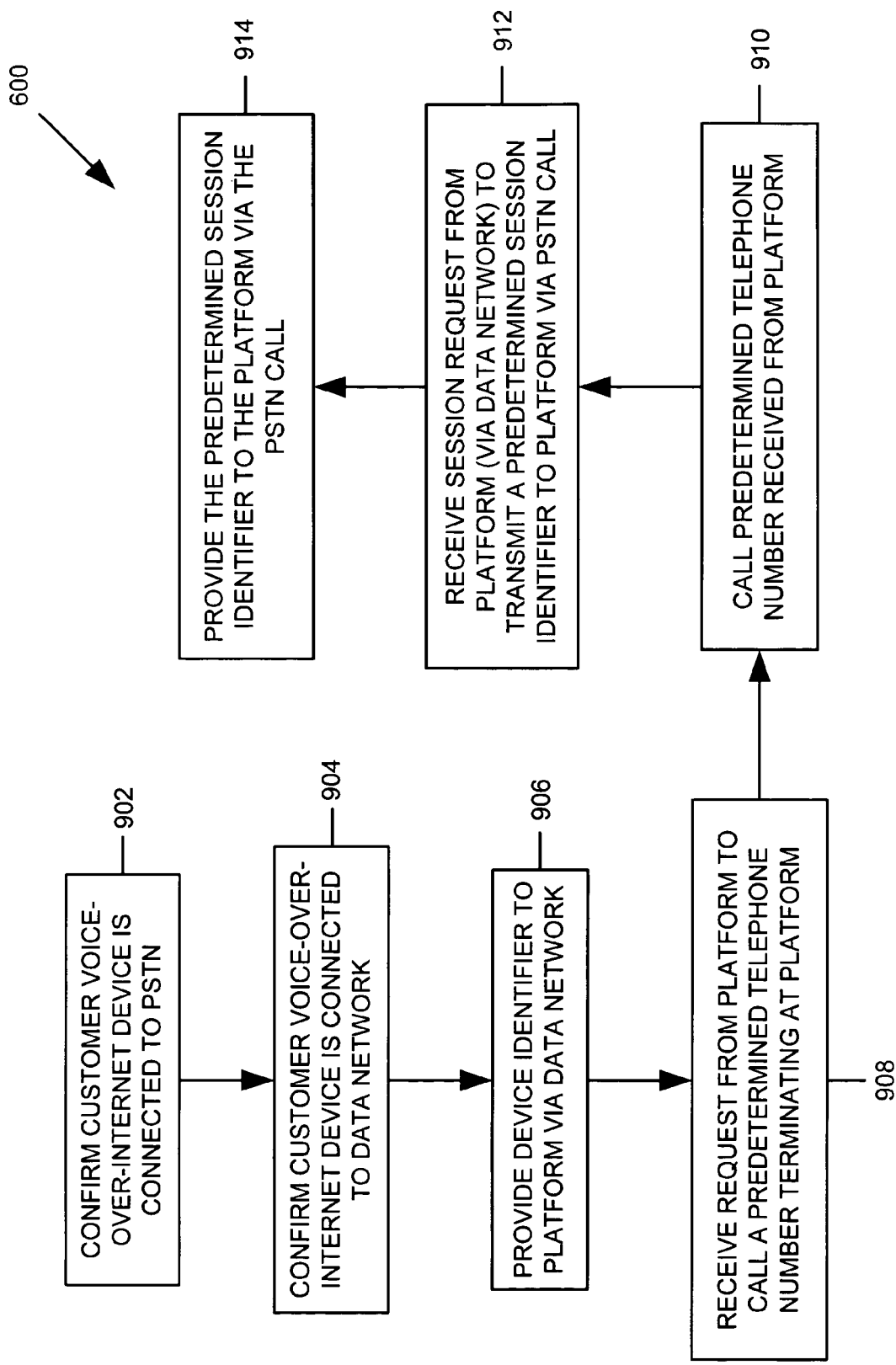
FIG. 9 is a flow chart illustrating the architecture, operation, and/or functionality of an embodiment of the VOI provisioning module in the customer VOI device of FIG. 6.

Having described the general components of an embodiment of customer VOI device 102 and VOI platform 104, embodiments of VOI provisioning module 600 and TNBS 112 will be described with reference to FIGS. 9 and 10. FIG. 9 illustrates the architecture, operation, and/or functionality of an embodiment of VOI provisioning module 600. At block 902, VOI provisioning module 600 confirms that customer VOI device 102 is connected to PSTN 108. At block 904, VOI provisioning module 600 confirms that customer VOI device 102 is connected to data network 110. If customer VOI device 102 is properly connected, at block 906, VOI provisioning module 600 may begin the auto-provisioning process by establishing contact with VOI platform 104.

It should be appreciated that VOI provisioning module 600 may support a number of communication protocols. For example, VOI provisioning module 600 may be configured to support HTTP, HTTPS, SIP, as well as any other suitable protocol over data network 110. Where SIP is implemented, VOI provisioning module 600 may initially register with, for example, a SIP proxy 704 associated with VOI platform 104. Furthermore, where HTTPS is implemented, VOI provisioning module 600 may issue a "GET" request to an HTTPS server associated with VOI platform. Regardless of the implementing protocol, at block 906, VOI provisioning module 600 provides device identifier 502 to VOI platform 104. In one embodiment, device identifier 502 comprises a digital certificate which is signed by a root certificate for VOI platform 104.

If device identifier 502 is authenticated by VOI platform 104, VOI provisioning module 600 receives (at block 908) a request from VOI platform 104 (e.g., call-to-platform request 504—FIG. 5), which instructs VOI provisioning module 600 to call VOI platform 104 via PSTN 108. At block 910, VOI provisioning module 600 initiates the telephone call to VOI platform 104 over PSTN 108 via the telephone interface (e.g., POTS interface 604—FIG. 6). At block 912, VOI provisioning module 600 receives another request from VOI platform 104 via data interface 602, which instructs VOI provisioning module 600 to transmit session identifier 508. At block 914, VOI provisioning module 600 provides session identifier 508 to VOI platform 104 via the telephone interface. As described above, when VOI platform 104 matches the transmitted session identifier to session identifier 508, the customer's existing telephone number (captured via the telephone call) is linked to device identifier 502 (or otherwise associated with customer VOI device 102). Although not shown in FIG. 9, after the existing telephone number is bound to customer VOI device 102, VOI provisioning module 600 may receive further information from VOI platform 104 to complete the provisioning process.

Figure 10:
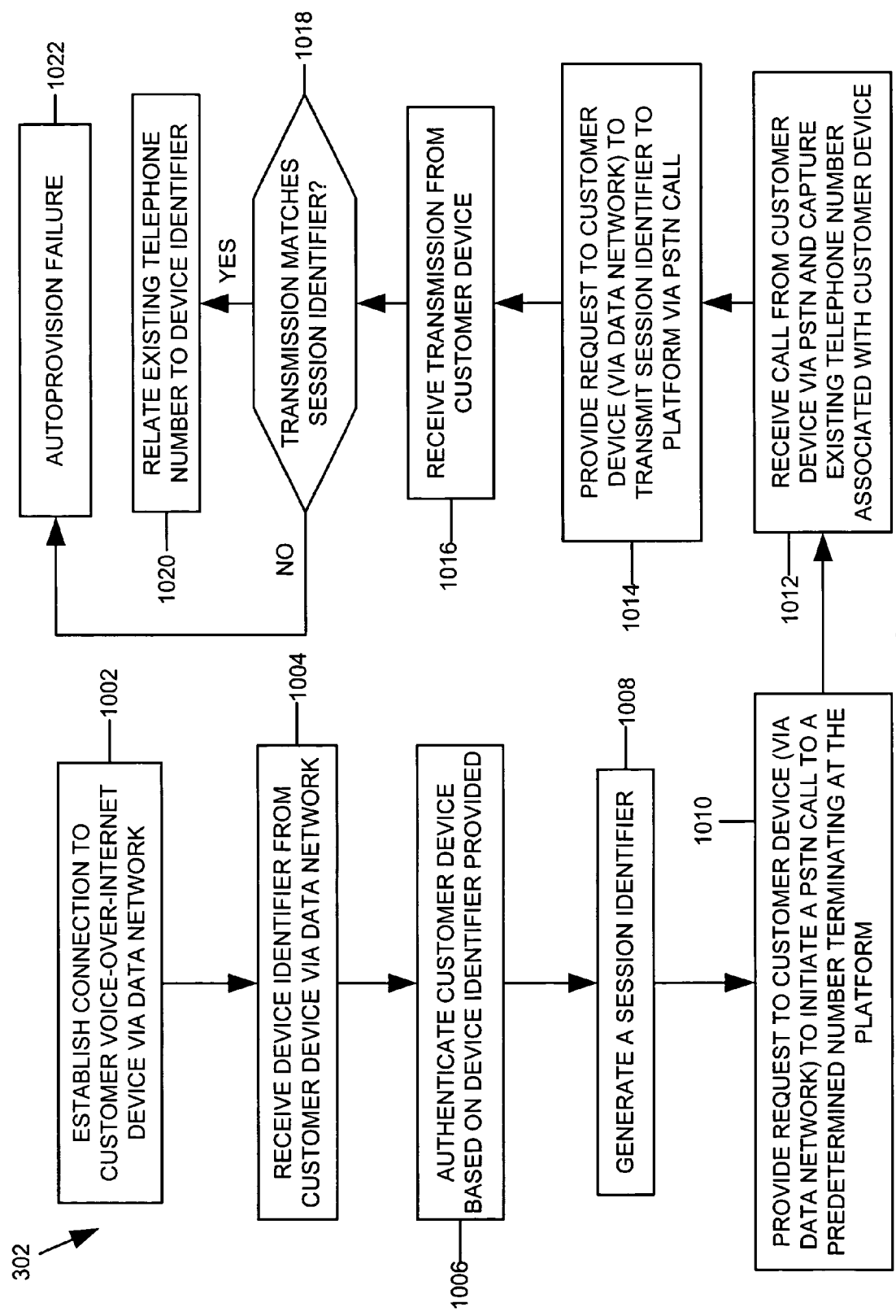
FIG. 10 is a flow chart illustrating the architecture, operation, and/or functionality of an embodiment of the telephone number binding system in the VOI platform of FIG. 7

FIG. 10 illustrates the architecture, operation, and/or functionality of an embodiment of TNBS 112. TNBS 112 controls the provisioning process at VOI platform 104. In the embodiment of FIG. 10, at block 1002, TNBS 112 establishes a connection to customer VOI device 102 via data network 110. For instance, in the embodiment described above, VOI provisioning module 600 may initiate a request to web server 702 and/or SIP proxy 704. After customer VOI device 102 is authenticated based on the submitted device identifier (blocks 1004 and 1006), TNBS 112 may be notified that a data connection has been established. At block 1008, TNBS 112 generates a unique identifier for the data session (e.g., session identifier 508). At block 1010, TNBS 112 initiates call-to-platform request 504, which instructs customer VOI device 102 to place a telephone call to VOI platform 104. At block 1012, TNBS 112 receives notification that the telephone call from customer VOI device 102 has been received. TNBS 112 also receives the existing telephone number associated with the call. At block 1014, TNBS 112 initiates transmit-session-identifier request 506, which instructs customer VOI device 102 to transmit session identifier 508 via the telephone call. It should be appreciated that, in some embodiments, TNBS 112 may not actually provide the requests to customer VOI device 102. Rather, it should be appreciated that TNBS 112 may route the requests to the appropriate component(s) within VOI platform 102. In this regard, TNBS 112 may control the provisioning process but delegate tasks to the appropriate components. Similarly, TNBS 112 may not actually receive communications directly from customer VOI device 102. Instead, the communications may be received by other component(s) in VOI platform 104 and forwarded to TNBS 112.

At block 1016, TNBS 112 receives the transmission from customer VOI device 102. At decision block 1018, TNBS 112 determines whether the transmitted information matches session identifier 508. If there is not a match, TNBS 112 may indicate, at block 1022, that the provisioning process has failed. If there is a match, TNBS 112 associates, at block 1020, the customer's existing telephone number to customer VOI device 102.

As mentioned above and described below in more detail, customer VOI device 102 and VOI platform 104 may support various protocols, including the Session Initiation Protocol (SIP). With reference to Tables 1-23, an exemplary implementation of the SIP will be described to illustrate an embodiment of the related communications between customer VOI device 102 and VOI platform 104 to provision VOI service(s). For particular reference, SIP is described in detail in RFCs 3261, 3262, 3263, 3264, and 3265, each of which are hereby incorporated by reference in their entirety. Other protocols, including a Session Description Protocol (SDP) and real-time Transport Protocol (RTP) are used in this exemplary implementation. SDP is described in more detail in RFC 2327 and RTP is described in more detail in RFCs 1889, 1890, and 2833—all of which are hereby incorporated by reference in their entirety.

Table 1 below illustrates various example variables that are referenced in the following description of one of a number of exemplary SIP implementations. Where public addresses appear in the exemplary SIP messages, they are not presented in numeric form as they would otherwise appear to avoid compromising any existing public information. Rather, this information is included as a data variable indicated in bold text. For example, rather than specify the actual public IP address for the customer VOI device, the information is presented as REMOTE-IP-ADDRESS. One of ordinary skill in the art will also appreciate that the exemplary SIP messages may not appear below in a fully SIP-compliant data format due to word wrapping, etc. For example, those of ordinary skill in the art will appreciate that SIP may require certain forms of wrapping in the SIP header lines which are not illustrated in the Tables.

It should be further appreciated that these exemplary SIP messages are merely one of a number of possible SIP implementations. One of ordinary skill in the art will appreciate that various alternative SIP messages may be employed. Furthermore, it should be appreciated that any SIP implementation may include various other SIP messages, sequences, etc. for handling retransmit contingencies and other reliability issues, to name a few.

TABLE 1

Example Variables for Exemplary SIP Implementation

Serial number for Customer VOI Device: 2940411657
Public IP address for Customer VOI Device: REMOTE-IP-ADDRESS
SIP Proxy FQDN: proxy.televolution.net
SIP Proxy IP Address: PROXY-IP-ADDRESS
HTTPS Server for VOI Platform: voiprov.televolution.net Although not discussed in the exemplary SIP implementation, one of ordinary skill in the art will appreciate that additional techniques may be employed to traverse Network Address Translation (NAT) in the residential environment. In the examples below, the SIP transactions occur between VOI platform 104 and a particular customer VOI device 102 over a data link via the data network. Therefore, it is assumed that the NAT traversal algorithms and techniques (where appropriate to employ) have been successful, resulting in properly formed and fully operative SIP signaling.

The exemplary SIP implementation will be described by referencing the general function, operation, etc. of the blocks of FIGS. 4a and 4b. In the exemplary SIP implementation, firmware of customer VOI device 102 may be programmed to trigger the action of block 404 when it has successfully registered with the SIP proxy. The initial credentials for customer VOI device 102 may be factory-configured and shared between server and device. When the customer VOI device 102 boots (e.g., starts up, is turned on, etc.), it attempts to register to the VOI platform SIP proxy using the SIP protocol.

Customer VOI device 102 device sends a REGISTER request, such as illustrated in Table 2 below.

TABLE 2

SIP Register Request

REGISTER sip:proxy.televolution.net SIP/2.0
Via: SIP/2.0/UDP REMOTE-IP-ADDRESS;branch=z9hG4bK-37fad796
From: 2940411657
<sip:2940411657@proxy.televolution.net>;tag=f8c505bd6e42aefo0
To: 2940411657 <sip:2940411657@proxy.televolution.net>
Call-ID: a95095f8-6820ddb6@192.168.1.106
CSeq: 1 REGISTER
Max-Forwards: 70
Contact: 2940411657
<sip:2940411657@ REMOTE-IP-ADDRESS:5060>;expires=3600
Warning: 399 pg "Restricted Cone NAT Detected"
User-Agent: ATNB-VOI-Device/0.963
Content-Length: 0
Allow: ACK, BYE, CANCEL, INFO, INVITE, NOTIFY, OPTIONS, REFER
Supported: x-atnb The VOI platform SIP proxy may authenticate customer VOI device 102. For example, the HTTP Digest authentication method, as specified in RFC 3261 (which is hereby incorporated by reference in its entirety) may be used. The VOI platform SIP proxy may respond with the response illustrated in Table 3 to challenge the REGISTER request.

TABLE 3

Response to REGISTER Request

SIP/2.0 407 Proxy Authentication Required
Via: SIP/2.0/UDP REMOTE-IP-ADDRESS:5060;branch=z9hG4bK-37fad796
From: 2940411657
<sip:2940411657@proxy.televolution.net>;tag=f8c505bd6e42aefo0
To: 2940411657
<sip:2940411657@proxy.televolution.net>;tag=as0b8c1e70
Call-ID: a95095f8-6820ddb6@192.168.1.106
CSeq: 1 REGISTER
Server: TelEvolution Server
Allow: INVITE, ACK, CANCEL, OPTIONS, BYE, REFER
Contact: <sip:2940411657@PROXY-IP-ADDRESS>
Proxy-Authenticate: Digest realm="pg.televolution.net",
nonce="478696c7"
Content-Length: 0

Customer VOI device 102 then generates the proper credentials and re-issues the REGISTER request with credentials as illustrated in Table 4.

TABLE 4

REGISTER sip:proxy.televolution.net SIP/2.0
Via: SIP/2.0/UDP REMOTE-IP-ADDRESS:5060;branch=z9hG4bK-32879537
From: 2940411657
<sip:2940411657@proxy.televolution.net>;tag=f8c505bd6e42aefo0
To: 2940411657 <sip:2940411657@proxy.televolution.net>
Call-ID: a95095f8-6820ddb6@192.168.1.106
CSeq: 2 REGISTER
Max-Forwards: 70
Proxy-Authorization: Digest
username="2940411657",realm="pg.televolution.
 net",nonce="478696c7",uri="sip:2940411657@proxy.
 televolution.net",algorithm=MD5,response=
 "1c66abaad8ff9d9278ea52400bd97a3a"
Contact: 2940411657
<sip:2940411657@ REMOTE-IP-ADDRESS:5060>;expires=3600

TABLE 4-continued

Warning: 399 pg "Restricted Cone NAT Detected"
User-Agent: ATNB-VOI-Device/0.963
Content-Length: 0
Allow: ACK, BYE, CANCEL, INFO, INVITE, NOTIFY, OPTIONS, REFER
Supported: x-atnb Assuming the credentials are valid, the VOI platform SIP proxy may respond as illustrated in Table 5 with an "OK" response.

TABLE 5

SIP/2.0 200 OK
Via: SIP/20/UDP REMOTE-IP-ADDRESS:5060;branch=z9hG4bK-32879537
From: 2940411657 <sip:2940411657@proxy.televolution.
net>;tag=f8c505bd6e42aefo0
To: 2940411657 <sip:2940411657@proxy.televolution.
net>;tag=as0b8c1e70
Call-ID: a95095f8-6820ddb6@192.168.1.106
CSeq: 2 REGISTER
Server: TelEvolution Server
Allow: INVITE, ACK, CANCEL, OPTIONS, BYE, REFER
Expires: 3600
Contact: <sip:2940411657@PROXY-IP-ADDRESS>;expires=3600
Date: Mon, 06 Sep 2004 22:56:23 GMT
Content-Length: 0

This registration process enables calls destined for customer VOI device 102. Calls to customer VOI device 102 delivered to the above registration will ring the telephone attached to customer VOI device 102.

In the exemplary SIP implementation, customer VOI device 102 may also register as a separately addressable SIP end-point for its PSTN connection. This creates two virtual addressable paths to the VOI device. This allows the VOI platform to independently interact with the user (phone) and the PSTN (telephone line) through the VOI device.

This second registration is much like the first registration described above, but using a different (auxiliary) username and SIP port as illustrated in Table 6.

TABLE 6

REGISTER sip:proxy.televolution.net SIP/2.0
Via: SIP/2.0/UDP REMOTE-IP-ADDRESS:5061;branch=z9hG4bK-eefb58ba
From: 2940411657 <sip:fxo-
2940411657@proxy.televolution.net>;tag=9e0244fbeb05becfo1
To: 2940411657 <sip:fxo-2940411657@proxy.televolution.net>
Call-ID: 9ee083e8-24684886@192.168.1.106
CSeq: 1 REGISTER
Max-Forwards: 70
Contact: 2940411657 <sip:fxo-2940411657@ REMOTE-IP-
       ADDRESS:5061>;expires=3600
Warning: 399 pg "Restricted Cone NAT Detected"
User-Agent: ATNB-VOI-Device/0.963
Content-Length: 0
Allow: ACK, BYE, CANCEL, INFO, INVITE, NOTIFY, OPTIONS, REFER
Supported: x-atnb The VOI platform SIP proxy may also authenticate this registration, in a manner similiar to the previous example, by sending the challenge to customer VOI device 102 as illustrated in Table 7.

TABLE 7

SIP/2.0 407 Proxy Authentication Required
Via: SIP/2.0/UDP REMOTE-IP-ADDRESS:5061;branch=z9hG4bK-eefb58ba
From: 2940411657 <sip:fxo-
2940411657@proxy.televolution.net>;tag=9e0244fbeb05becfo1
To: 2940411657 <sip:fxo-2940411657@proxy.televolution.
net>;tag=as73c61822
Call-ID: 9ee083e8-24684886@192.168.1.106
CSeq: 1 REGISTER
Server: TelEvolution Server
Allow: INVITE, ACK, CANCEL, OPTIONS, BYE, REFER
Contact: <sip:fxo-2940411657@PROXY-IP-ADDRESS>
Proxy-Authenticate: Digest realm="pg.televolution.net",
nonce="05e89020"
Content-Length: 0

Customer VOI device 102 then sends a challenge-response with proper credentials as illustrated in Table 8.

TABLE 8

REGISTER sip:proxy.televolution.net SIP/2.0
Via: SIP/2.0/UDP REMOTE-IP-ADDRESS:5061;branch=z9hG4bK-d3f84f9c
From: 2940411657 <sip:fxo-
2940411657@proxy.televolution.net>;tag=9e0244fbeb05becfo1
To: 2940411657 <sip:fxo-2940411657@proxy.televolution.net>
Call-ID: 9ee083e8-24684886@192.168.1.106
CSeq: 2 REGISTER
Max-Forwards: 70
Proxy-Authorization: Digest username="fxo-
2940411657",realm="pg.televolution.
net",nonce="05e89020",uri="sip:fxo-
2940411657@proxy.televolution.net",algorithm=
MD5,response="2b6802bc05986218c1587a86dc0f4908"
Contact: 2940411657 <sip:fxo-2940411657@ REMOTE-IP-
ADDRESS:5061>;expires=3600
Warning: 399 pg "Restricted Cone NAT Detected"
User-Agent: ATNB-VOI-Device/0.963
Content-Length: 0
Allow: ACK, BYE, CANCEL, INFO, INVITE, NOTIFY, OPTIONS,
REFER
Supported: x-atnb Assuming the credentials are valid, the VOI platform SIP proxy responds with "OK" to complete the registration, as illustrated in Table 9.

TABLE 9

SIP/2.0 200 OK
Via: SIP/2.0/UDP REMOTE-IP-ADDRESS:5061;branch=z9hG4bK-d3f84f9c
From: 2940411657 <sip:fxo-
2940411657@proxy.televolution.net>;tag=9e0244fbeb05becfo1
To: 2940411657 <sip:fxo-2940411657@proxy.televolution.
net>;tag=as73c61822
Call-ID: 9ee083e8-24684886@192.168.1.106
CSeq: 2 REGISTER
Server: TelEvolution Server
Allow: INVITE, ACK, CANCEL, OPTIONS, BYE, REFER
Expires: 3600
Contact: <sip:fxo-2940411657@PROXY-IP-ADDRESS>;expires=3600
Date: Mon, 06 Sep 2004 22:56:23 GMT
Content-Length: 0

This second registration applies to the PSTN connection of customer VOI device 102.

With the above sequences complete, customer VOI device 102 has successfully registered with VOI platform 104. When this process completes, customer VOI device 102 initiates the action shown at block 404 (FIG. 4). It should be appreciated that customer VOI device 102 may actually initiate the action shown at block 404 after some predetermined time (e.g., one hour), whether it has successfully completed the above registration process(es) or not. This is to provide a mechanism for VOI platform 104 to control and interact with customer VOI device 102 through configuration parameters, if for some reason the device is unable to register (in which case VOI platform 104 cannot interact with or control customer VOI device 102 using SIP).

Customer VOI device 102 may attempt the action shown at block 404 regardless of the state of the PSTN connection. In other words, it will try to perform telephone phone number binding, whether the PSTN line appears live or not.

Referring again to block 404, customer VOI device 102 may initiate an HTTPS GET request to initiate the binding process. Therefore, it should be appreciated that customer VOI device 102 may comprise HTTP and HTTPS client capabilities. In one embodiment, customer VOI device 102 may function like a browser requesting web pages from remote Internet sites. In this manner, customer VOI device 102 provides a very reliable means of reaching VOI platform 104, even if customer VOI device 102 is connected through a Network Address Translation (NAT) router, firewall, etc.

Customer VOI device 102 may also implement the Secure Socket Layer (SSL) protocol. This enables the VOI device HTTP client to connect to servers using the secure HTTPS protocol. This is the same protocol used universally to secure internet transactions, such as to submit credit card information on web-site purchases, and to obtain bank and investments statements over the Internet. HTTPS encrypts the communication between client and server, protecting the message contents from other intervening network devices. Beyond encryption, HTTPS also provides for the authentication of the server and the client engaged in a secure transaction. This feature ensures that VOI platform 104 and the individual VOI clients cannot be spoofed by other nodes on the network.

The means for server and client authentication in SSL is private key cryptography, and the issuance of public certificates corresponding to private keys. The essential property of private key cryptography is that content encrypted with a public key can only be decrypted by its corresponding private key (and vice versa). Certificates are authenticated in the context of a certificate chain. A certificate authority lies at the root of the chain, with all other certificates ultimately depending on the root authority for authentication.

The VOI platform HTTPS server may be configured with an SSL server certificate that has been signed by the VOI platform root certificate. The firmware running on customer VOI device 102 may recognize such certificates as valid. The clients attempt to authenticate the server certificate when connecting via HTTPS, and will reject any server certificate not signed by the proper authority. This mechanism may protect the VOI system from direct network attacks on the VOI end-point, in which the attacker attempts to spoof a particular VOI platform server. If successful, such an attack would allow the attacker to re-provision the VOI device, presumably to gain configuration information or assume control of the VOI device.

Lacking the private key corresponding to a valid server and root certificates, the attacker will be unable to fake an authorized communication with customer VOI device 102, foiling this attack strategy. Server certificates are the only certificates required in a typical secure web transaction. However, the VOI system described here also uses client certificates to prevent rogue client requests. Each VOI device 102 carries a unique client certificate. Each client certificate is signed by the VOI platform root certificate, and carries identifying information about that specific VOI device 102. The certificate authority root certificate capable of authenticating the VOI device client certificate is used by VOI platform 104 to authenticate and identify VOI devices. Requests from unauthorized clients are rejected by VOI platform 104.

The combination of server certificates and client certificates ensures the secure communication between a remote VOI device 102 and VOI platform 104. VOI device 102 can assert with confidence that it is communicating with the correct VOI platform server and the VOI platform server can assert with confidence the identity of the specific remote VOI device 102 it is communicating with. Furthermore, VOI platform 104 and VOI device 102 can both assert that the transaction is protected from eavesdropping.

VOI device 102 may issue an HTTPS GET request to the VOI platform server. For example, the VOI device may issue a /prov/ft URL request to invoke a CGI (Common Gateway Interface) application on the HTTPS server. As known in the art, CGI is a standard mechanism for invoking external gateway applications on web servers. A CGI program is executed in real-time, so that it can take action and output dynamic information. Other mechanisms for executing an application in real-time on the server based on an HTTPS request could be used, such as Java Server Pages (JSP), Active Server Pages (ASP), PHP, and other similar technologies.

Referring to block 406, the VOI platform HTTPS server may be configured to require client certificates. In this case, the VOI device client certificate contains a unique identifier for the specific individual VOI device 102. The HTTPS server supplies the certificate information to the /prov/ft CGI application.

Referring to block 408, the VOI platform HTTPS server may process requests from VOI devices 102 that provide a valid certificate, as described above. The /prov/ft CGI application processes requests if the VOI device identifier contained in the certificate is valid. State may be maintained on VOI platform 104 about each known VOI device identifier. The /prov/ft CGI application knows the state of the device making the request and can therefore determine the action to take for the VOI device 102. If the /prov/ft CGI application determines that the requesting device is in need of telephone number binding, it sets the state for the VOI device to PENDING and adds the VOI device identifier to the queue of devices requiring number binding. Another application of VOI platform 104 may process the queue and initiate the binding process for each device sequentially. When this application begins the binding process for a given VOI device 102, it allocates a Binding Session ID for the specific binding session associated with a given VOI device. The Binding Session ID is a sequence of digits.

Referring to block 410, the binding application of VOI platform 104 instructs the VOI platform SIP proxy to initiate a call to VOI device 102 for the active binding session. The VOI platform SIP proxy initiates the call using SIP protocol with an INVITE request (Table 10) sent to the VOI Device at the registered location established at block 402 described above.

TABLE 10

INVITE sip:18882225555@ REMOTE-IP-ADDRESS:5061 SIP/2.0
Via: SIP/2.0/UDP PROXY-IP-
ADDRESS:5060;branch=z9hG4bK7e8e24f0
From: "Admin" <sip:admin@PROXY-IP-ADDRESS>;tag=as4ab9dab4
To: <sip:18882225555@REMOTE-IP-ADDRESS:5061>
Contact: <sip:admin@PROXY-IP-ADDRESS>
Call-ID: 6540e2c22085ee3708d270086740841b@PROXY-IP-ADDRESS TABLE 10-continued CSeq: 102 INVITE
User-Agent: TelEvolution Server
Date: Mon, 06 Sep 2004 22:58:01 GMT
Allow: INVITE, ACK, CANCEL, OPTIONS, BYE, REFER
Content-Type: application/sdp
Content-Length: 292
v=0
o=root 3133 3133 IN IP4 PROXY-IP-ADDRESS
s=session
c=IN IP4 PROXY-IP-ADDRESS
t=0 0
m=audio 15088 RTP/AVP 0 3 8 2 101
a=rtpmap:0 PCMU/8000
a=rtpmap:3 GSM/8000
a=rtpmap:8 PCMA/8000
a=rtpmap:2 G726-32/8000
a=rtpmap:101 telephone-event/8000
a=fmtp:101 0-16
a=silenceSupp:off - - - -

VOI device 102 uses the HTTP Digest authentication mechanism to authenticate the VOI platform proxy, by responding to the above request with a challenge as illustrated in Table 11.

TABLE 11

SIP/2.0 401 Unauthorized
To: <sip:18882225555@REMOTE-IP-ADDRESS:5061>;tag=
9e11f16bb76c7d1fi1
From: "Admin" <sip:admin@ PROXY-IP-ADDRESS >;tag=as4ab9dab4
Call-ID: 6540e2c22085ee3708d270086740841b@ PROXY-IP-ADDRESS
CSeq: 102 INVITE
Via: SIP/2.0/UDP PROXY-IP-ADDRESS:5060;branch=
z9hG4bK7e8e24f0
Server: ATNB-VOI-Device/0.963
WWW-Authenticate: Digest realm="proxy.televolution.net",
nonce="c061f6ac",
qop="auth", algorithm=md5
Content-Length: 0

The VOI platform proxy acknowledges this response as illustrated in Table 12.

TABLE 12

ACK sip:18882225555@REMOTE-IP-ADDRESS:5061 SIP/2.0
Via: SIP/2.0/UDP 207.218.69.98:5060;branch=z9hG4bK7e8e24f0
From: "Admin" <sip:admin@ PROXY-IP-ADDRESS >;tag=as4ab9dab4
To: <sip:18882225555@ REMOTE-IP-ADDRESS:5061>;tag=
9e11f16bb76c7d1fi1
Contact: <sip:admin@ PROXY-IP-ADDRESS >
Call-ID: 6540e2c22085ee3708d270086740841b@ PROXY-IP-ADDRESS
CSeq: 102 ACK
User-Agent: TelEvolution Server
Content-Length: 0

The VOI platform proxy then re-issues the INVITE with proper credentials (the challenge-response) as illustrated in Table 13.

TABLE 13

INVITE sip:18882225555@ REMOTE-IP-ADDRESS:5061 SIP/2.0
Via: SIP/2.0/UDP PROXY-IP-ADDRESS:5060;branch=
z9hG4bK454201f1
From: "Admin" <sip:admin@ PROXY-IP-ADDRESS >;tag=as4ab9dab4
To: <sip:18882225555@ REMOTE-IP-ADDRESS:5061>
Contact: <sip:admin@ PROXY-IP-ADDRESS >
Call-ID: 6540e2c22085ee3708d270086740841b@ PROXY-IP-ADDRESS
CSeq: 103 INVITE
User-Agent: TelEvolution Server TABLE 13-continued

```
Authorization: Digest username="fxo-2940411657",
realm="proxy.televolution.net",
algorithm="MD5", uri="sip:18882225555@
REMOTE-IP-ADDRESS:5061",
nonce="c061f6ac", response="496fbdaa9ef5e7aa91a2691485793297",
opaque="",
qop="auth", cnonce="5fcd12c7", nc=00000001
Date: Mon, 06 Sep 2004 22:58:01 GMT
Allow: INVITE, ACK, CANCEL, OPTIONS, BYE, REFER
Content-Type: application/sdp
Content-Length: 292
v=0
o=root 3133 3134 IN IP4 PROXY-IP-ADDRESS
s=session
c=IN IP4 207.218.69.98
t=0 0
m=audio 15088 RTP/AVP 0 3 8 2 101
a=rtpmap:0 PCMU/8000
a=rtpmap:3 GSM/8000
a=rtpmap:8 PCMA/8000
a=rtpmap:2 G726-32/8000
a=rtpmap:101 telephone-event/8000
a=fmtp:101 0-16
a=silenceSupp:off - - - -
```

Assuming the credentials are valid, VOI device 102 may initiate the call over the PSTN and indicate to VOI platform 104 that the call is proceeding by sending various Informational Responses as defined in SIP RFC 3261, which is hereby incorporated by reference in its entirety. For example, customer VOI device 102 may initiate the process illustrated in Table 14.

TABLE 14

```
SIP/2.0 100 Trying
To: <sip:18882225555@ REMOTE-IP-ADDRESS:5061>
From: "Admin" <sip:admin@ PROXY-IP-ADDRESS >;tag=as4ab9dab4
Call-ID: 6540e2c22085ee3708d270086740841b@ PROXY-IP-ADDRESS
CSeq: 103 INVITE
Via: SIP/2.0/UDP PROXY-IP-ADDRESS:5060;branch=
z9hG4bK454201f1
Server: ATNB-VOI-Device/0.963
Content-Length: 0
```

This process initiates a call from VOI platform 104 to the VOI device 102 PSTN port with SIP Call-ID 6540e2c22085ee3708d270086740841b@ PROXY-IP-ADDRESS. The SIP INVITE transaction associated with this Call-ID exists across several steps until terminated with a final SIP response, such as the "200 OK" response described below with respect to block 414.

This Call-ID is part of a SIP INVITE dialog that exists across several of the following steps until the BYE request associated with block 420. Note that the INVITE request includes Session Description Protocol (SDP) information, which indicates the format and acceptable encodings to be used for the media associated with the call. In this case, the media includes an RTP digital audio stream and an RFC 2833 telephone-event payload for carrying dual-tone multifrequency (DTMF) digits.

Referring to block 412, customer VOI device 102 dials the number specified above using the attached POTS line. The line may indicate ringing and customer VOI device 102 may send an informational response to VOI platform 104 as illustrated in Table 15.

TABLE 15

```
SIP/2.0 180 Ringing
To: <sip:18882225555@ REMOTE-IP-ADDRESS:5061>;tag=
7bda10521fe93d7di1
From: "Admin" <sip:admin@ PROXY-IP-ADDRESS >;tag=as4ab9dab4
Call-ID: 6540e2c22085ee3708d270086740841b@ PROXY-IP-ADDRESS
CSeq: 103 INVITE
Via: SIP/2.0/UDP PROXY-IP-ADDRESS:5060;branch=
z9hG4bK454201f1
Server: ATNB-VOI-Device/0.963
Content-Length: 0
```

Referring to block 414, the call to the designated number is received at VOI platform 104. VOI platform 104 answers the call and receives ANI information indicating the number of the calling party, which is the existing telephone number of the line used by VOI device 102 to place the call. It should be appreciated that caller-ID or calling party number (CPN) techniques may be employed, but may be less reliable because ANI is used internally by telephone carriers for billing purposes. While CPN is created by the sending equipment, ANI is generated and sent by the telephone network and cannot be blocked by the caller.

When VOI platform 104 answers the call, VOI device 102 detects that condition on its PSTN interface and indicates that the call is established by sending the appropriate SIP response to the INVITE request initiated at block 410 above—as illustrated in Table 16.

TABLE 16

```
SIP/2.0 200 OK
To: <sip:18882225555@ REMOTE-IP-ADDRESS:5061>;tag=
7bda10521fe93d7di1
From: "Admin" <sip:admin@ PROXY-IP-ADDRESS >;tag=as4ab9dab4
Call-ID: 6540e2c22085ee3708d270086740841b@ PROXY-IP-ADDRESS
CSeq: 103 INVITE
Via: SIP/2.0/UDP PROXY-IP-ADDRESS:5060;branch=
z9hG4bK454201f1
Contact: 2940411657 <sip:18882225555@
REMOTE-IP-ADDRESS:5061>
Server: ATNB-VOI-Device/0.963
Content-Length: 233
Allow: ACK, BYE, CANCEL, INFO, INVITE, NOTIFY,
OPTIONS, REFER
Supported: x-atnb
Content-Type: application/sdp
v=0
o=- 12072 12072 IN IP4 REMOTE-IP-ADDRESS
s=-
c=IN IP4 REMOTE-IP-ADDRESS
t=0 0
m=audio 16476 RTP/AVP 0 100 101
a=rtpmap:0 PCMU/8000
a=rtpmap:100 NSE/8000
a=rtpmap:101 telephone-event/8000
a=fmtp:101 0-15
a=ptime:30
a=sendrecv
```

This response may include the SDP information for VOI device 102 indicating how the VOI device 102 wishes to receive media for the call, including telephone-event DTMF data. The VOI platform SIP proxy acknowledges this response, per the SIP protocol, sending the SIP message illustrated in Table 17.

TABLE 17

```
ACK sip:18882225555@ REMOTE-IP-ADDRESS:5061 SIP/2.0
Via: SIP/2.0/UDP PROXY-IP-ADDRESS:5060;branch=
```

TABLE 17-continued

```
z9hG4bK1d2c11c8
From: "Admin" <sip:admin@ PROXY-IP-ADDRESS >;tag=as4ab9dab4
To: <sip:18882225555@ REMOTE-IP-ADDRESS:5061>;tag=
7bda10521fe93d7di1
Contact: <sip:admin@ PROXY-IP-ADDRESS >
Call-ID: 6540e2c22085ee3708d270086740841b@ PROXY-IP-ADDRESS
CSeq: 103 ACK
User-Agent: TelEvolution Server
Content-Length: 0
```

At this point the SIP call is established from VOI platform 104 to customer VOI device 102. This call persists across the following steps, until the BYE request associated with block 420. In other words, VOI platform 104 enters into a listening state for DTMF tones on the incoming call from the PSTN.

Referring to block 416, when VOI platform 104 answers the call, it sends the Binding Session ID over the established SIP call to VOI device 102. It does this using the media path established by the SIP INVITE for that call. The DTMF digits may be sent to VOI device 102 using RFC 2833 telephone-event path specified in the 200 OK response from VOI device 102 in block 414 above.

Referring to block 418, as the VOI device receives the DTMF digits sent on the SIP call (over the data link), it translates these digits into the corresponding actual DTMF analog tones and transmits them out the PSTN connection (POTS port).

At block 420, VOI platform 104 receives the DTMF digits over the PSTN connection. When it collects sufficient digits, it performs a check to see if the digits received match the Binding Session ID. Additional functions may be performed to improve the reliability of the DTMF transmission process. For example, customer VOI device 102 may use redundancy by transmitting each digit multiple times, so that if one instance of a DTMF digit gets distorted or interrupted over the PSTN, at least one of the other copies should get through. Furthermore, VOI platform 104 may test for "similarity" of the received digits to the original Binding Session ID using the Levenshtein string distance algorithm, rather than requiring an exact match.

VOI platform 104 may hang up the phone. This is detected by VOI device 102 on its POTS line, and VOI device 102 terminates the SIP call by sending a BYE request to VOI platform 104—as illustrated in Table 18.

TABLE 18

```
BYE sip:admin@ PROXY-IP-ADDRESS SIP/2.0
Via: SIP/2.0/UDP REMOTE-IP-ADDRESS:5061;branch=
z9hG4bK-995ec579
From: <sip:18882225555@ REMOTE-IP-ADDRESS:5061>;tag=
7bda10521fe93d7di1
To: "Admin" <sip:admin@ PROXY-IP-ADDRESS >;tag=as4ab9dab4
Call-ID: 6540e2c22085ee3708d270086740841b@ PROXY-IP-ADDRESS
CSeq: 101 BYE
Max-Forwards: 70
User-Agent: ATNB-VOI-Device/0.963
Content-Length: 0
```

VOI platform 104 accepts the BYE request by sending an "OK" response, as illustrated in Table 19.

TABLE 19

```
SIP/2.0 200 OK
Via: SIP/2.0/UDP REMOTE-IP-ADDRESS:5061;branch=
z9hG4bK-995ec579
From: <sip:18882225555@ REMOTE-IP-ADDRESS:5061>;tag=
7bda10521fe93d7di1
To: "Admin" <sip:admin@ PROXY-IP-ADDRESS >;tag=as4ab9dab4
Call-ID: 6540e2c22085ee3708d270086740841b@ PROXY-IP-ADDRESS
CSeq: 101 BYE
Server: TelEvolution Server
Allow: INVITE, ACK, CANCEL, OPTIONS, BYE, REFER
Contact: <sip:admin@ PROXY-IP-ADDRESS >
Content-Length: 0
```

VOI platform 104 terminates the call initiated at block 410. At this point, the SIP dialog with Call-ID 6540e2c22085ee3708d270086740841b@ PROXY-IP-ADDRESS is no longer active.

Referring to block 422, if the received digits match the Binding Session ID per the algorithms described above, VOI platform 104 completes the binding process by associating the existing telephone phone number obtained at block 414 with the customer VOI device 102 associated with the active binding request. As mentioned above, the binding or association process may be performed in a variety of ways. For example, in one embodiment, the telephone number may be looked up in a Calling Name Database (CNAM) to determine the name associated with the telephone number. The telephone number and name for customer VOI device 102 are then stored into a name/number to a mapping database (e.g., database 114). If no CNAM data exists for the phone number, the number is still bound to VOI device 102, without any corresponding name data.

Furthermore, a Naming Authority Pointer (NAPTR) (RFC 2915) entry may be added to the VOI platform E.164 to Uniform Resource Identifiers (URI) Dynamic Delegation Discovery System (DDDS) (ENUM) (RFC 3761). This NAPTR entry maps the E.164 number associated with the phone number to a SIP URI associated with the VOI Device.

VOI platform 104 instructs VOI device 102 to perform an HTTPS action to obtain final configuration parameters. This is performed by VOI platform 104 sending a SIP NOTIFY request to VOI device 102 with a 'resync' event specified—as illustrated in Table 20.

TABLE 20

```
NOTIFY sip:fxo-2940411657@ REMOTE-IP-ADDRESS:5061 SIP/2.0
Via: SIP/2.0/UDP PROXY-IP-ADDRESS:5060;branch=z9hG4bK2f030fdc
From: "admin" <sip:admin@ PROXY-IP-ADDRESS >;tag=as03cbffcc
To: <sip:fxo-2940411657@ REMOTE-IP-ADDRESS:5061>
Contact: <sip:admin@ PROXY-IP-ADDRESS >
Call-ID: 449c35d52d54920a5ad85e72628c6ade@ PROXY-IP-ADDRESS
CSeq: 102 NOTIFY
User-Agent: TelEvolution Server
Event: resync
Content-Length: 0
```

The action may be authenticated by VOI device 102. VOI device 102 may challenge the request as illustrated in Table 21.

TABLE 21

SIP/2.0 401 Unauthorized
To: <sip:fxo-2940411657@ REMOTE-IP-ADDRESS:5061>;tag=9e11f16bb76c7d1fi1
From: "admin" <sip:admin@ PROXY-IP-ADDRESS >;tag=as03cbffcc
Call-ID: 449c35d52d54920a5ad85e72628c6ade@ PROXY-IP-ADDRESS
CSeq: 102 NOTIFY
Via: SIP/2.0/UDP PROXY-IP-ADDRESS:5060;branch=z9hG4bK2f030fdc
Server: ATNB-VOI-Device/0.963
WWW-Authenticate: Digest realm="proxy.televolution.net", nonce="61c840fa",
qop="auth", algorithm=md5
Content-Length: 0

VOI platform 104 may re-send the NOTIFY request with the proper credentials (challenge-response) as illustrated in Table 22.

TABLE 22

NOTIFY sip:fxo-2940411657@ REMOTE-IP-ADDRESS:5061 SIP/2.0
Via: SIP/2.0/UDP PROXY-IP-ADDRESS:5060;branch=z9hG4bK3ca8147f
From: "admin" <sip:admin@ PROXY-IP-ADDRESS >;tag=as03cbffcc
To: <sip:fxo-2940411657@ REMOTE-IP-ADDRESS:5061 >;tag=9e11f16bb76c7d1fi1
Contact: <sip:admin@ PROXY-IP-ADDRESS >
Call-ID: 449c35d52d54920a5ad85e72628c6ade@ PROXY-IP-ADDRESS
CSeq: 103 NOTIFY
User-Agent: TelEvolution Server
Authorization: Digest username="fxo-2940411657", realm="proxy.televolution.net",
algorithm="MD5", uri="sip:fxo-2940411657@ REMOTE-IP-ADDRESS:5061",
nonce="61c840fa", response="45562bb38eddb4f652942141fb783c49", opaque="",
qop="auth", cnonce="01057216", nc=00000001
Date: Mon, 06 Sep 2004 22:58:38 GMT
Event: resync
Allow: INVITE, ACK, CANCEL, OPTIONS, BYE, REFER
Content-Length: 0

Customer VOI device 102 may accept the request as illustrated in Table 23.

TABLE 23

SIP/2.0 200 OK
To: <sip:fxo-2940411657@ REMOTE-IP-ADDRESS:5061>;tag=9e11f16bb76c7d1fi1
From: "admin" <sip:admin@ PROXY-IP-ADDRESS >;tag=as03cbffcc
Call-ID: 449c35d52d54920a5ad85e72628c6ade@ PROXY-IP-ADDRESS
CSeq: 103 NOTIFY
Via: SIP/2.0/UDP PROXY-IP-ADDRESS:5060;branch=z9hG4bK3ca8147f
Server: ATNB-VOI-Device/0.963
Content-Length: 0

At this point, customer VOI device 102 may request, in response to the NOTIFY event above, the HTTPS url with the following message: https://voiprov.televolution.net/prov/ft. When the /prov/ft CGI application executes, it will observe that the telephone number binding process for customer VOI device 102 has completed. As a result, it will then change the state of the device to BOUND, and update customer VOI device 102 parameters as appropriate for final operation.

For example, this may include changing the VOI device configuration such that subsequently the device will obtain configuration data from a static file using the HTTP protocol, rather than executing the /prov/ft CGI application using HTTPS. In this case, separate explicit encryption is used instead of SSL. The configuration data is encrypted using 256-bit AES in CBC mode with a shared secret. This is much more efficient than HTTPS and greatly reduces the load on the VOI platform 104. In this way, the expensive HTTPS method is used during initial provisioning and to safely establish the shared secret used for the static file method, while the much more efficient HTTP protocol and AES encryption is used in production after initial provisioning. This technique provides effective security while ensuring efficiency and scalability to reduce operating costs.

Figure 11:
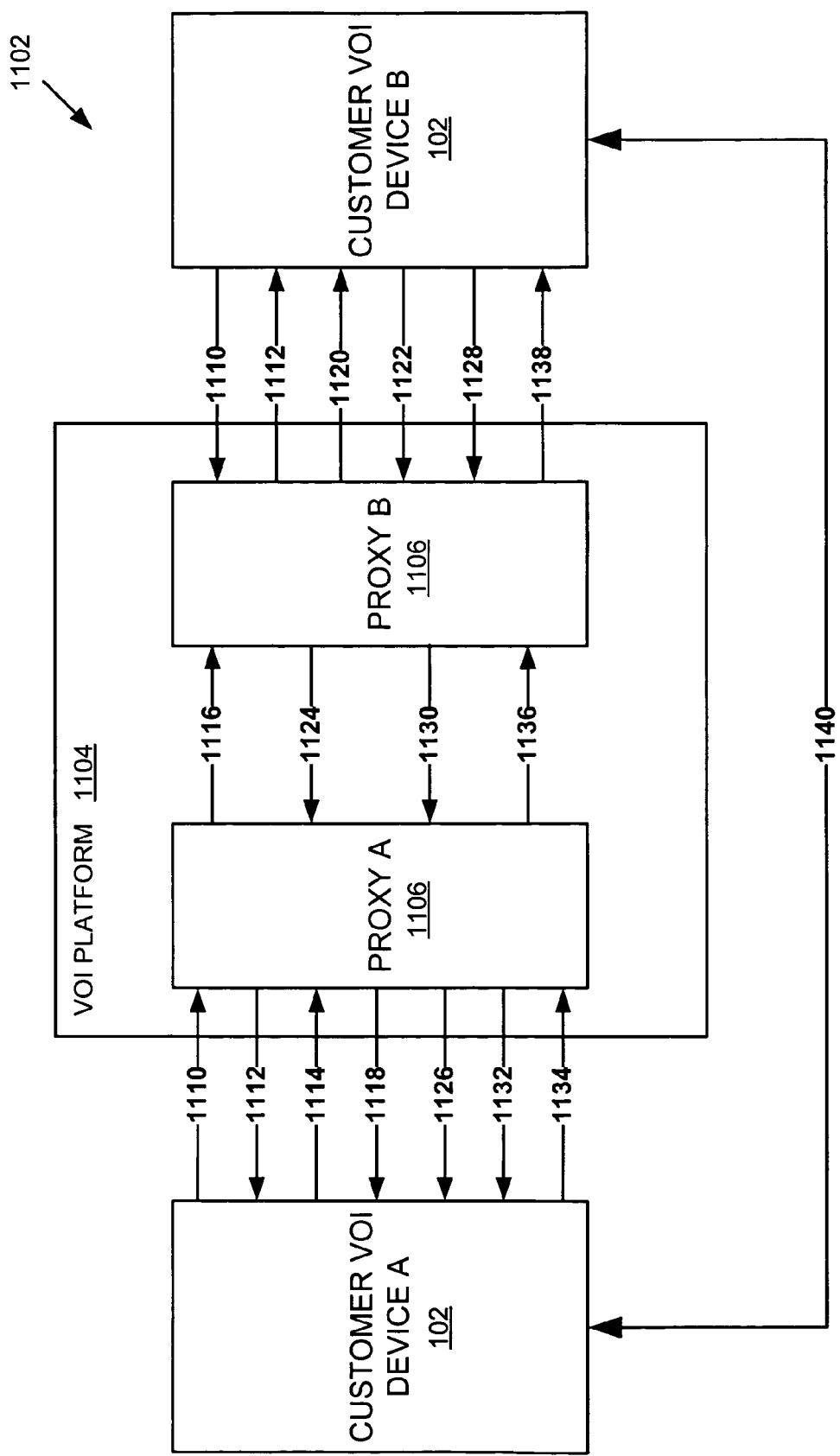
FIG. 11 is a combined block diagram and flow diagram that illustrates an embodiment of a method and/or VOI platform for providing VOI services.

FIG. 11 is a combined block diagram and flow diagram illustrating an exemplary method employed by VOI platform 104 for establishing calls between customer VOI devices 102. In this example, customer VOI device A initiates a call to customer VOI device B. In this regard, device A corresponds to the calling party and device B corresponds to the called party. The method illustrated in FIG. 11 is based on the SIP protocol described above.

As known in the art, within an SIP infrastructure, calls are placed to SIP URIs. A URI is the generic set of all names/addresses that are short strings that refer to resources. Here the focus will be purely on SIP URIs, or the format of URIs which denote a SIP address. SIP URIs are described in more detail in RFC 3261, which is hereby incorporated by reference in its entirety. The SIP address may take any of the following, or other, forms: (1) sip:user:password@domain:port;uri-parameters?headers; (2) sip:user@domain:port; and (3) sip:user@domain. The user is the name of the user being addressed. The domain is the host providing the SIP resource (in this case the VOI calling service). The domain is typically a fully-qualified domain name, but it may also be a numeric IP address (e.g., IPv4, IPv6, etc.). The port is the port to which the request is to be sent. It is common for this token to be omitted, in which a default port (e.g., port 5060) is established. The port number may also be specified in SRV DNS records, so SIP implementations which support such DNS lookups may obtain the port number via DNS. If the port number is specified in the URI it may override DNS. Customer VOI devices 102 may be configured with a unique SIP URI. The URI is what distinctly identifies a specific device and permits other compatible devices to connect to and start a conversation with any other device.

Prior to a call being initiated, customer VOI devices A and B may register with their respective SIP proxy servers (reference lines 1110). Both devices A and B receive acknowledgement (e.g., a "200 OK") from the respective SIP proxies indicating that registration succeeded (reference lines 1112). The calling party associated with device A initiates a call by sending an INVITE to proxy A (reference line 1114). The INVITE includes SDP information specifying the media parameters this node supports/desires, including codecs, ports, IP address for the streams, etc. Using DNS lookups, proxy A determines that proxy B is authoritative for the SIP URI being called, and forwards the INVITE to proxy B (reference line 1116). A message (e.g., "100 TRYING" message) may be sent back to device A (reference line 1118).

Proxy B receives the INVITE, checks to see if device B is currently registered, and if so passes the INVITE to device B (as illustrated by reference line 1120). Device B accepts the INVITE and returns an acknowledge (e.g., "180 RINGING" message), as illustrated by reference line 1122, to proxy B.

Proxy B forwards the acknowledgement message to proxy A (reference line 1124). As illustrated by reference line 1126, proxy A forwards the acknowledgement message to device A. When user B finally picks up the telephone corresponding to device B, the device accepts the call and returns another message (reference line 1128) to proxy B (e.g., "a 200 OK" message). The "200 OK" message may include SDP information specifying the media parameters supported by device B, including codecs, ports, and the IP address for the streams.

Proxy B forwards the 200 OK message back to proxy A (reference line 1130). Proxy A forwards the 200 OK message back to device A (reference line 1132). As illustrated by reference line 1134, device A returns an acknowledge (ACK) message to proxy A, which may include appropriate SDP information. Proxy A forwards the ACK message to proxy B (reference line 1136). Proxy B forwards the ACK message to device B (reference line 1138). As illustrated by reference line 1140, device A and device B may then communicate directly with each other without the aid of the corresponding proxies.

The INVITE from device A may require authentication by proxy A. For example, various provisional response packets may be passed between the proxies and the devices, but these should have no affect on the overall call setup. Once the basic call is established, media parameters may be altered via RE-INVITE messages via proxies A and B.

The SIP registration process (reference lines 1110 and 1112) may be implemented as follows. As known in the art, SIP supports a dynamic registration mechanism. SIP end-points send REGISTER requests to a registration server to register their physical location with the SIP service of record. This provides limited mobility for SIP end-points. The REGISTER requests have an expiry and the end-points refresh their registration by sending REGISTER requests periodically, as determined by the end node configuration.

In order for an end-node to receive a call, it should be registered with the service (the proper SIP proxy/registrar). The REGISTER requests tell the proxy/registrar where to route the calls for the given user name. Calls to unregistered destinations result in a SIP error, usually 480 Temporarily Unavailable, which will usually produce a fast-busy tone for the calling party (depending on their phone/software). SIP uses a challenge-based authentication mechanism which is based on HTTP authentication defined in RFC 2617, which is hereby incorporated by reference in its entirety. An exemplary registration sequence may be implemented as follows:

(1) the client device sends a REGISTER packet to the SIP proxy;
(2) the SIP proxy returns a "401 Unauthorized" packet, which contains a realm and a "nonce" which will be used by the client to construct its response;
(3) the client responds with a new REGISTER packet with authorization information in it; the response may be a MD5 checksum of the username, the password, the nonce, and the realm;
(4) the server generates the same MD5 checksum and compares it with that sent by the client; if they match, the registration is accepted and a "200 OK" packet is returned.

As mentioned above, given a SIP URI, a call can be placed from one SIP node to another. Another mechanism may be used to translate numbers dialed by users into corresponding SIP URIs. In effect, a telephone number in a SIP service is nothing more than a simple "label". The number is only given meaning by the rules used by the system to process the dialed number. The manner in which a dialed number is processed is often referred to as a dialing plan or numbering plan.

A numbering plan is nothing more than making decisions about how to route a call based upon examination of the number dialed by the user. In practice, any processing rules could be used. Furthermore, the routing logic may be configured to process various prefixes. In one embodiment, the logic dialing model is configured to mirror the numbering plan of an existing local telephone service to simplify the process for customers.

For instance, customer VOI devices 102 may contain region-specific dialing plan processing rules to support traditional PSTN-style dialing for that region. The region may be specified by the country code associated with customer VOI device 102 or set by factory configuration according to the local (within that country code) PSTN number associated with the device (e.g., determined through the TNBS process for that country-code/region).

Customer VOI devices 102 and VOI platform 104 may be designed to support the ITU-T Recommendation E.164 numbering plan. The system may make use of E.164 to Uniform Resource Identifiers (URI) Dynamic Delegation Discovery (ENUM) as defined in RFC 3761. RFC 3761 defines a way to use NAPTR queries to convert an E.164 number to a SIP URI.

For example, a fully-defined E.164 number, as written on paper, looks something like this: +1-555-444-1111". The plus-sign at the beginning of the number is a notation meaning "what follows should be interpreted as an E.164 number". An exemplary process may operate as follows.

1. Strip off all the punctuation from the number (remove all spaces, plus-signs, dashes, etc.) to yield "15554441111"
2. Put a period between all the digits—"1.5.5.5.4.4.4.1.1.1.1."
3. Reverse the order—"1.1.1.1.4.4.4.5.5.5.1"
4. Append ".e164.arpa"—1.1.1.1.4.4.4.5.5.5.1.e164.arpa 5. Now, an NAPTR query on 1.1.1.4.4.4.5.5.5.1.e164.arpa may be performed.

The basic format of the NAPTR record is: domain IN NAPTR order pref flags service regexp replacement. The fields have the following meanings:

Domain

The domain label for the NAPTR record, e.g., sip.earthlink.net or sip.mindspring.com.

Order

An integer number specifying the order of preference in the case of multiple NAPTR records for the same domain label. This is similar to the preference field of a MX record in email. Lower numbers mean "more preferred."

Pref

A "preference" value. An integer number specifying order of preference in the event of multiple records having the same domain label and the same value for "order". Again, lower numbers mean "more preferred."

Flags

This field is a character string, enclosed in quotes. RFC 2915 defines four flags: "S", "A", "U", and "P". The "S" and "U" flags are of primary interest in a SIP infrastructure. The "S" flag means that the "replacement" field from the NAPTR record should be used to do a query on a SRV record. The "U" flag means that the "regexp" field should be applied to the SIP URI, potentially rewriting the URI. This is most commonly used to implement reverse lookups for a phone number.

Service

A character string which lists the type of service being described by the NAPTR record. The values of this field are completely service-dependent.

An exemplary NAPTR record for an E.164 entry would look as follows: 1.1.1.1.4.4.4.5.5.5.1.e164.arpa IN NAPTR 50 50 "u" "E2U+sip" "!^\\+15554441111$!sip:12345@sip.voipservice.net!". When the above steps are performed, the dialed number +15554441111 will be directed to the SIP URI sip:12345@sip.voipservice.net. VOI platform 104 may operate in much the same manner, with exception of the use of a private domain, rather than the "e164.arpa". The TNBS process ultimately results in a NAPTR record being created for the PSTN number associated with the specific customer VOI device, with the number being represented in full E.164 form. The NAPTR record directs the E.164 number to the SIP URI for the specific customer VOI device.

When placing a call from a customer VOI device 102, the region-specific dialed number processing of the device may perform some local-specific processing to identify local numbers, and other numbers that should be directed to the attached PSTN connection (POTS port). For example, special processing may be performed for 911, 411, etc. The dialed number may be normalized into an E.164 form and a process such as defined in RFC 3761 performed. If a matching NAPTR is found, a SIP call is attempted to the SIP URI specified by the matching NAPTR record. If the SIP call fails, depending on configuration settings, the call may be attempted using the attached PSTN connnection (POTS port). When the SIP call is successful, a peer-to-peer session is established between customer VOI devices (or other compatible end-points).

One of ordinary skill in the art will appreciate that VOI provisioning module(s) 600 and TNBS 112 may be implemented in software, hardware, firmware, or a combination thereof. Accordingly, in one embodiment, VOI auto-provisioning module(s) 600 and TNBS 112 are implemented in software or firmware that is stored in a memory and that is executed by a suitable instruction execution system (e.g., processor 606—FIG. 6).

In hardware embodiments, VOI auto-provisioning module(s) 600 and TNBS 112 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be further appreciated that the process descriptions or functional blocks related to FIGS. 1-11 represent modules, segments, or portions of logic, code, etc. which include one or more executable instructions for implementing specific logical functions or steps in the process. It should be further appreciated that any logical functions may be executed out of order from that shown or discussed, including substantially concurrently or in reverse order, depending on the functionality involved, as would be understood by those reasonably skilled in the art.

Furthermore, VOI provisioning module(s) 600 and TNBS 112 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although this disclosure describes the invention in terms of exemplary embodiments, the invention is not limited to those embodiments. Rather, a person skilled in the art will construe the appended claims broadly, to include other variants and embodiments of the invention, which those skilled in the art may make or use without departing from the scope and range of equivalents of the invention.

What is claimed is:

1. A method for provisioning a customer voice-over-Internet device for voice-over-Internet service, the method comprising:

providing a customer voice-over-Internet device for communication with an existing telephone line and a data network;

providing a telephone number associated with the existing telephone line to a voice-over-Internet platform; and linking the existing telephone number to a unique identifier associated with the customer voice-over-Internet device, the providing the telephone number associated with the existing telephone line occurring via a telephone call over the existing telephone line between the voice-over-Internet platform and the customer voice-over-Internet device and wherein the telephone call is initiated by the customer voice over-Internet device in response to a request from the voice-over-Internet platform instructing the customer voice-over-Internet device to dial a predetermined number that terminates at the voice-over-Internet platform.

2. The method of claim 1, wherein the request from the voice-over-Internet platform comprises a session identifier.

3. The method of claim 1, wherein the linking the existing telephone number to the unique identifier associated with the customer voice-over-Internet device is responsive to the operation of a data session over the data network and the telephone call.

4. The method of claim 3, wherein the operation of the data session and the telephone call is concurrent.

5. The method of claim 1, wherein the voice-over-Internet platform automatically captures the telephone number associated with the existing telephone line via an automated number identification service.

6. The method of claim 1, wherein the providing a telephone number associated with the existing telephone line comprises:

providing a device identifier associated with the customer voice-over-Internet device to the voice-over-Internet platform;

instructing the customer voice-over-Internet device, to initiate a telephone call to the voice-over-Internet platform; and capturing the telephone number via the telephone call at the voice-over-Internet platform.

7. The method of claim 1, further comprising authenticating the telephone number provided to the voice-over-Internet platform.

8. The method of claim 7, wherein the authenticating the telephone number provided to the voice-over-Internet platform comprises:

requesting an authentication number to be provided to the voice-over-Internet platform; and providing the authentication number to the voice-over-Internet platform.

9. The method of claim 8, wherein the requesting the authentication number to be provided to the voice-over-Internet platform occurs via a data session with the voice-over-Internet platform.

10. The method of claim 8, wherein the providing the authentication number to the voice-over-Internet platform occurs via the existing telephone line.

11. The method of claim 8, wherein the providing the authentication number to the voice-over-Internet platform occurs via an interactive voice response system.

12. The method of claim 1, further comprising authenticating the telephone number using a closed-loop connection with the voice-over-Internet platform via the data network and the existing telephone line.

13. A voice-over-Internet system comprising:

a customer device comprising a data interface for communicating via a data network and a telephone interface for communicating with the public-switched telephone network (PSTN);

a voice-over-Internet platform for communicating with the customer device via the PSTN and a data session that occurs over the data network; and a telephone number binding system associated with the voice-over-Internet platform, the telephone number binding system configured to provision the customer device by linking a customer's existing telephone number to a unique device identifier corresponding to the customer device, wherein the telephone number binding system instructs the customer via the data session to initiate a telephone call to the voice-over-Internet platform, the telephone number binding system capturing the customer's existing telephone number via the telephone call initiated by the customer.

14. The voice-over-Internet system of claim 13, wherein the telephone number binding system captures the customer's existing telephone number from the customer via an interactive voice response system.

15. The voice-over-Internet system of claim 13, wherein the telephone number binding system authenticates the customer's existing telephone number via one of the data session and a telephone call between the voice-over-Internet platform and the customer.

16. The voice-over-Internet system of claim 13, wherein the telephone number binding system authenticates the customer's existing telephone number via one of the data session and a telephone call between the voice-over-Internet platform and the customer device.

17. The voice-over-Internet system of claim 13, wherein the telephone number binding system authenticates the customer's existing telephone number by:

requesting an authentication number be provided to the voice-over-Internet platform;

receiving a customer-specified authentication number; and confirming that the customer-specified authentication number matches the authentication number.

18. The voice-over-Internet system of claim 17, wherein the requesting the authentication number occurs via one of the data session and a telephone call via the PSTN and the receiving the customer-specified authentication occurs via the other of the data session and the telephone call.

19. The voice-over-Internet system of claim 13, wherein the voice-over-Internet platform comprises:

a web server for communicating with the customer device via the data session;

a telephone interface for communicating with the customer device via the PSTN; and a database containing information corresponding to the telephone number/device identifier binding.

20. The voice-over-Internet system of claim 19, wherein the web server comprises a HTTPS server.

21. The voice-over-Internet system of claim 19, further comprising a session initiation protocol (SIP) proxy that authenticates the customer device via the data session based on the device identifier received from the customer device.

22. The voice-over-Internet system of claim 13, wherein the customer device comprises logic configured to provide the device identifier to the voice-over-Internet platform via the data session; and logic configured to receive, via the data session, a request from the voice-over-Internet platform to transmit, via the telephone call, the system-generated session identifier.

23. The voice-over-Internet system of claim 13, wherein the telephone number binding system comprises:
- logic configured to receive the device identifier from the customer device via the data session;
- logic configured to instruct the customer, via the data session, to make a telephone call to a predetermined number that terminates at the voice-over-Internet platform;
- logic configured to determine the telephone number corresponding to the customer device based on the telephone call;
- logic configured to instruct the customer device, via the data session, to transmit the system-generated session identifier; and
- logic configured determine whether the transmitted session identifier matches the system-generated session identifier.

* * * * *